United States Patent
Schimpf et al.

(10) Patent No.: US 12,449,066 B2
(45) Date of Patent: Oct. 21, 2025

(54) LOCKING APPARATUS WITH ROLLER FOR WIRE MANAGEMENT

(71) Applicant: Easy Solar Products, Inc., Holladay, UT (US)

(72) Inventors: Brady Schimpf, Eagle Point, OR (US); Brady Hoddinott, New Hartford, CT (US); Benjamin Wade, Holladay, UT (US); Alexander Bornemann, Duxbury, VT (US)

(73) Assignee: Easy Solar Products, Inc., Sandy, UT (US)

( * ) Notice: Subject to any disclaimer, the term of this patent is extended or adjusted under 35 U.S.C. 154(b) by 0 days.

(21) Appl. No.: 18/384,165

(22) Filed: Oct. 26, 2023

(65) Prior Publication Data

US 2024/0167587 A1    May 23, 2024

Related U.S. Application Data

(63) Continuation-in-part of application No. 18/087,634, filed on Dec. 22, 2022, now Pat. No. 12,209,693.
(Continued)

(51) Int. Cl.
*F16L 3/01*    (2006.01)
*F16B 2/06*    (2006.01)
*F16L 3/06*    (2006.01)

(52) U.S. Cl.
CPC .................. *F16L 3/01* (2013.01); *F16B 2/06* (2013.01); *F16L 3/06* (2013.01)

(58) Field of Classification Search
CPC .................. F16L 3/01; F16L 3/06; F16B 2/06
See application file for complete search history.

(56) References Cited

U.S. PATENT DOCUMENTS 1,475,256 A * 11/1923 Belair ..................... E05B 75/00
  70/49
3,994,521 A * 11/1976 Van Gompel ......... F16G 11/108
  292/319
(Continued)

FOREIGN PATENT DOCUMENTS

AU    2003203898 B2    11/2003
CA    2710620 A1 *    1/2011    ............. G09F 3/037
(Continued)

OTHER PUBLICATIONS

Heyco S6410 sunbundler10 cable tie crimp lock sold on amazon.com, first available date Oct. 11, 2013 https://www.amazon.com/Heyco-S6410-SunBundler10-Stainless-Package/dp/B00FSOJVIA? (Year: 2013).*
(Continued)

*Primary Examiner* — Terrell L McKinnon
*Assistant Examiner* — Ding Y Tan
(74) *Attorney, Agent, or Firm* — KW Law, LLP

(57) ABSTRACT

A locking apparatus for wire management includes a housing, a fixing member, a locking mechanism within the housing configured to resist movement of the fixing member in a first direction and to allow movement of the fixing member in a second direction opposite the first direction where the locking mechanism includes one or more rollers. The locking apparatus includes a lock path extending from a lock path entrance, through the locking mechanism, to a lock path exit.

20 Claims, 21 Drawing Sheets

Related U.S. Application Data which is a continuation of application No. 17/990,683, filed on Nov. 19, 2022.

(56) References Cited

U.S. PATENT DOCUMENTS

| | | | | |
|---|---|---|---|---|
| 4,074,916 A * | 2/1978 | Schindler | ............... | F16G 11/14 292/307 R |
| 4,747,631 A * | 5/1988 | Loynes | .................. | F16G 11/14 292/307 R |
| 5,147,145 A * | 9/1992 | Facey | ................... | F16G 11/108 403/328 |
| 5,222,776 A * | 6/1993 | Georgopoulos | ........ | F16G 11/14 292/307 R |
| 5,359,870 A * | 11/1994 | Reutlinger | ............. | A44B 15/00 24/114.5 |
| 5,538,300 A * | 7/1996 | Brown | .................. | G09F 3/0352 292/307 R |
| 5,647,620 A * | 7/1997 | Kuenzel | ................ | G09F 3/0352 292/307 R |
| 5,743,574 A * | 4/1998 | Kohn | ................... | G09F 3/0358 292/315 |
| 5,829,280 A * | 11/1998 | Chen | ..................... | E05B 67/003 70/386 |
| 6,155,617 A * | 12/2000 | Kuenzel | ................. | F16G 11/14 292/307 R |
| 7,021,091 B2 * | 4/2006 | Leyden | .............. | E05B 73/0005 70/58 |
| 7,073,828 B2 * | 7/2006 | Foigel | .................. | G09F 3/0352 292/307 R |
| 7,278,665 B2 * | 10/2007 | Rogatnev | ............... | E05B 39/00 292/307 R |
| 8,578,566 B2 * | 11/2013 | Jolly | ....................... | F16G 11/14 292/307 R |
| 9,558,682 B2 * | 1/2017 | Dreisbach | ............ | F16G 11/106 |
| 10,400,917 B2 | 9/2019 | Kitago | | |
| 10,935,103 B2 * | 3/2021 | Moss | ................... | F16G 11/108 |
| 11,430,348 B2 * | 8/2022 | Lubenschii | ........... | B65D 55/02 |
| 2003/0111846 A1 * | 6/2003 | Brammall | ............ | G09F 3/0358 292/315 |
| 2004/0172790 A1 | 9/2004 | Caveney | | |
| 2005/0006910 A1 * | 1/2005 | Foigel | .................... | G09F 3/037 292/315 |
| 2006/0180717 A1 * | 8/2006 | Shuey | ....................... | F16L 3/24 248/72 |
| 2007/0181752 A1 * | 8/2007 | Shuey | .................. | F16G 11/108 248/72 |
| 2007/0262593 A1 * | 11/2007 | Littrell | .................... | G09F 3/037 292/307 R |
| 2009/0106947 A1 * | 4/2009 | Cai | ........................ | F16G 11/14 24/136 R |
| 2019/0183553 A1 * | 6/2019 | Bosshard | ............... | A61B 17/82 |
| 2020/0248781 A1 * | 8/2020 | Patterson | .............. | F16G 11/101 |
| 2021/0131148 A1 * | 5/2021 | Schroll | ................... | E05B 67/36 |

FOREIGN PATENT DOCUMENTS

| | | |
|---|---|---|
| CN | 202848332 U | 4/2013 |
| CN | 203167903 U | 9/2013 |
| CN | 210556675 U | 5/2020 |
| CN | 214825737 U | 11/2021 |
| EP | 1172781 A1 | 1/2002 |
| EP | 0861994 B1 | 10/2002 |
| EP | 1359356 A1 | 11/2003 |
| EP | 1400459 A1 | 3/2004 |
| ES | 2764274 T3 | 6/2020 |
| FR | 2844857 A3 | 3/2004 |
| GB | 1516783 A | 7/1978 |
| JP | 4520108 B2 | 8/2010 |
| JP | 5271277 B2 | 8/2013 |
| KR | 101407950 B1 | 6/2014 |
| RU | 2271426 C2 | 3/2006 |
| RU | EA024128 B1 | 6/2014 |
| TW | M320589 U | 10/2007 |
| WO | WO-2003012316 A1 * | 2/2003 |
| WO | 2006085735 A1 | 8/2006 |

OTHER PUBLICATIONS

WUBAO Wire Gaskets Numbered Adjustable Length Secure Tamper Proof Steel Labels sold on amazon.com, first available date: Jan. 11, 2019 https://www.amazon.de/-/en/Gaskets-Numbered-Adjustable-Length-Transport/dp/B07MF92GSD?th=1 (Year: 2019).*

BV, "4FT Security Steel Cable with Loops, Braided Steel Flex Cable, Bike Lock Cable 3/8 Inch, for U-Lock and Padlock", first available date: Jun. 1, 2017, https://www.amazon.com/BV-Security-Double-Braided-Padlock/dp/B071ZR3RQ6?th=1 (Year: 2017).

Urban Trapeze Cable Stop, "Adjuster and Gripper for 1/16 Inch Steel Cable or Wire Rope—No Crimping Tool Needed—Pack of 50", first available date: Jan. 16, 2019, https://www.amazon.com/BV-Security-Double-Braided-Padlock/dp/B071ZR3https://www.amazon.com/Urban-Trapeze-Adjuster-Gripper-Pieces/dp/B07MVDRKRM?th=+1RQ6 (Year: 2019).

U.S. Appl. No. 17/990,683, filed Nov. 19, 2022, Non-Final Office Action mailed Jan. 22, 2024.

Pro Fit, "Bravo Ball & Lock Plate", https://pro-fit-intl.com/products/bravo-ball-lock-plate, Pro Fit International, Inc., pp. 1-3.

U.S. Appl. No. 18/087,634, filed Dec. 22, 2022, Non-Final Office Action mailed Mar. 29, 2024.

PCT/US2023/080403, "International Search Report and the Written Opinion of the International Searching Authority", dated Mar. 19, 2024, pp. 1-18.

* cited by examiner

Top View

Side View

LOCKING APPARATUS WITH ROLLER FOR WIRE MANAGEMENT

CROSS-REFERENCES TO RELATED APPLICATIONS

This is a continuation-in-part application of and claims priority to U.S. patent application Ser. No. 18/087,634 entitled "LOCKING APPARATUS FOR WIRE MANAGEMENT" and filed on Dec. 22, 2022, for Brady Schimpf, et al., and U.S. patent application Ser. No. 17/990,683 entitled "LOCKING APPARATUS FOR WIRE MANAGEMENT WITH SLACK CABLE MANAGEMENT" and filed on Nov. 19, 2022, for Brady Schimpf, et al., which are incorporated herein by reference.

FIELD

This invention relates to wire management and more particularly relates to a locking apparatus with a roller for wire management.

BACKGROUND

Direct current ("DC") electricity typically flows from solar panels to one or more inverters through wires or cables run under the solar panels. Longer wire runs between the solar panels and inverters adds unnecessary cost, increases electrical resistance, and thus decreases efficiency of the solar power system. Therefore, the ideal route of wires is the shortest distance from panel to inverter. Traditional wire management methods, however, constrain runs to paths where the wires can be supported at points on mounting structure components or panel frames.

The wires are secured to solar panel frames or mounting structures to ensure the wires do not hang loose, sag, or come into contact with damaging or abrasive surfaces. The act of routing and securing these cables is commonly referred to as "wire management." The mounting structure and panel frames to which the wire management devices attach varies depending on factors such as: size of array, wind and snow loads, type and brand of panels and the mounting system. While solar panels have challenges for wire management, other wire management systems for interior and exterior applications are used to secure wires, wireways, and other structures. Current wire management systems break over time after being exposed to sunlight, wind, water, heat, cold, etc. and often fail long before the useful life of the solar panel system. Other wire management systems loosen over time and/or cut the protective cover of solar panel wiring.

SUMMARY

A locking apparatus for wire management is disclosed. The apparatus includes a housing, a fixing member, and a locking mechanism within the housing configured to resist movement of the fixing member in a first direction and to allow movement of the fixing member in a second direction opposite the first direction. The apparatus includes a lock path extending from a lock path entrance, through the locking mechanism, to a lock path exit. The apparatus includes a slack management opening integral to the housing and configured to hold a portion of the fixing member extending from the lock path exit.

Another locking apparatus for wire management includes a housing and a fixing member with a first and a second end opposite the first end. The fixing member is flexible and the first end of the fixing member is attached to the housing. The apparatus includes a locking mechanism within the housing configured to resist movement of the fixing member in a first direction and to allow movement of the fixing member in a second direction opposite the first direction. The apparatus includes a lock path extending from a lock path entrance, through the locking mechanism, to a lock path exit. The apparatus includes a slack management opening integral to the housing and configured to hold a portion of the fixing member extending from the lock path exit. The portion of the fixing member extending from the lock path exit includes the second end of the fixing member.

Another locking apparatus for wire management includes a housing with a stainless-steel inner portion covered with a covering. The apparatus includes a fixing member with a first and a second end opposite the first end. The fixing member is flexible and the first end of the fixing member is attached to the housing. The apparatus includes a locking mechanism within the housing configured to resist movement of the fixing member in a first direction and to allow movement of the fixing member in a second direction opposite the first direction. The apparatus includes a lock path extending from a lock path entrance, through the locking mechanism to a lock path exit. The apparatus includes a slack management opening integral to the housing and configured to hold a portion of the fixing member extending from the lock path exit. The portion of the fixing member extending from the lock path exit includes the second end of the fixing member. The slack management opening includes a slot on the housing where the slot is shaped to accommodate and retain a slack portion of the fixing member and where the slack portion of the fixing member on the portion of the fixing member extends from the lock path exit, and/or an opening through the housing. The opening is different from the lock path. Insertion of the fixing member into the opening holds the locking mechanism in a locked position.

Another locking apparatus includes a housing, a fixing member, and a locking mechanism within the housing configured to resist movement of the fixing member in a first direction and to allow movement of the fixing member in a second direction opposite the first direction. The locking apparatus includes a lock path extending from a lock path entrance, through the locking mechanism, to a lock path exit.

Another locking apparatus includes a housing and a fixing member with a first end and a second end opposite the first end. The fixing member includes a cable and the first end of the fixing member is attached to the housing. The locking apparatus includes a locking mechanism within the housing configured to resist movement of the fixing member in a first direction and to allow movement of the fixing member in a second direction opposite the first direction. The locking apparatus includes a lock path extending from a lock path entrance, through the locking mechanism, to a lock path exit.

Yet another locking apparatus includes a housing with a metallic inner portion covered with a covering. The locking apparatus includes a fixing member with a first end and a second end opposite the first end. The fixing member is a cable with a coating. The cable is a stainless-steel cable or a galvanized steel cable. The first end of the fixing member is attached to the housing. The locking apparatus includes a locking mechanism within the housing configured to resist movement of the fixing member in a first direction and to allow movement of the fixing member in a second direction opposite the first direction. The locking apparatus includes a lock path extending from a lock path entrance, through the locking mechanism to a lock path exit.

Another locking apparatus includes a housing, a fixing member, a locking mechanism within the housing configured to resist movement of the fixing member in a first direction and to allow movement of the fixing member in a second direction opposite the first direction where the locking mechanism includes a roller. The locking apparatus includes a lock path extending from a lock path entrance, through the locking mechanism, to a lock path exit.

Another locking apparatus includes a housing and a fixing member with a first end and a second end opposite the first end where the fixing member includes a cable and the first end of the fixing member is attached to the housing. The locking apparatus includes a locking mechanism within the housing configured to resist movement of the fixing member in a first direction and to allow movement of the fixing member in a second direction opposite the first direction. The locking mechanism includes a textured roller. A lock path extends from a lock path entrance, through the locking mechanism, to a lock path exit.

Another locking apparatus includes a housing and a fixing member with a first end and a second end opposite the first end. The fixing member includes a cable and the first end of the fixing member is attached to the housing. The locking apparatus includes locking mechanism within the housing configured to resist movement of the fixing member in a first direction and to allow movement of the fixing member in a second direction opposite the first direction. The locking mechanism includes a roller compartment with a textured roller. The roller compartment includes a bottom where the bottom is opposite a top portion. The fixing member extends through the roller compartment in the top portion and the bottom includes a sloped ramp angled upward towards a lock path entrance. A slope of the sloped ramp is in a range of 10 degrees to 35 degrees, and the top portion includes an upper channel sized to conform to a portion of the cable. A depth of the upper channel is in a range of 25 percent to 35 percent of a diameter of the cable. A lock path extends from the lock path entrance, through the locking mechanism, to a lock path exit.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
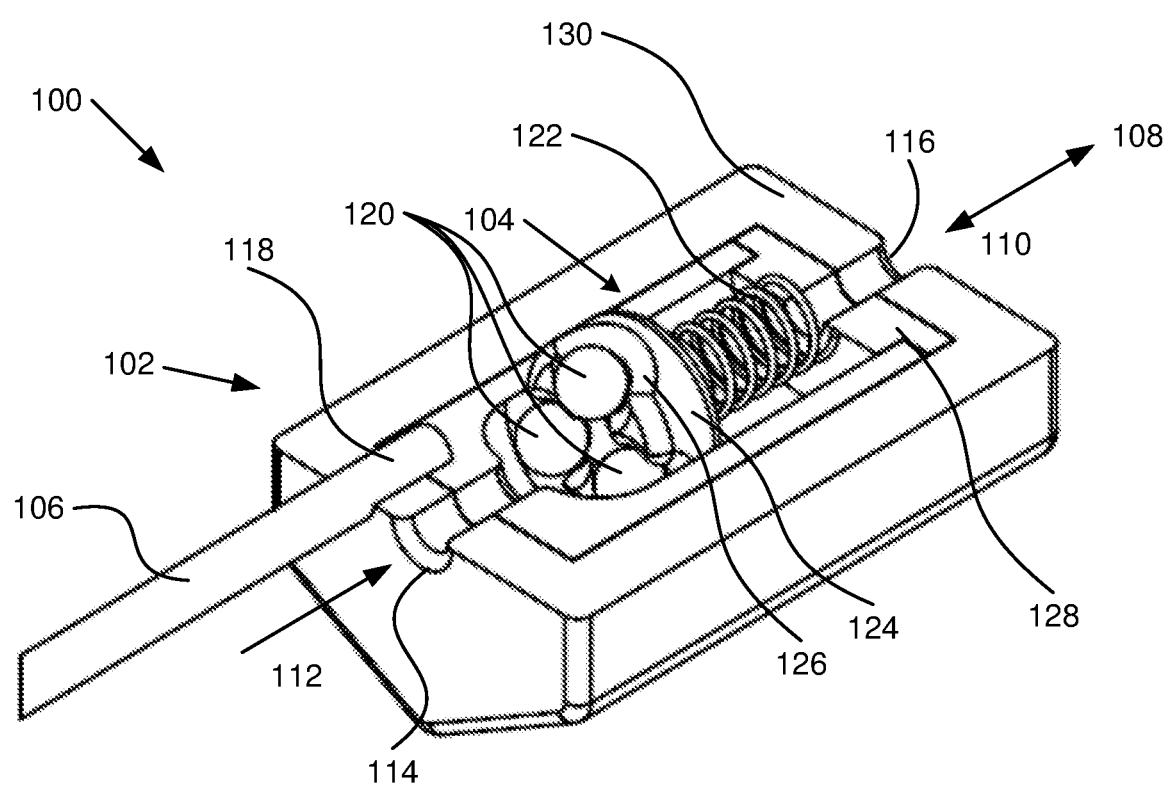
FIG. 1 is a perspective section view illustrating a locking apparatus with a housing with a three-ball locking mechanism and a fixing member connected to the housing, according to various embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A locking apparatus for wire management is disclosed. The apparatus includes a housing, a fixing member, and a locking mechanism within the housing configured to resist movement of the fixing member in a first direction and to allow movement of the fixing member in a second direction opposite the first direction. The apparatus includes a lock path extending from a lock path entrance, through the locking mechanism, to a lock path exit. The apparatus includes a slack management opening integral to the housing and configured to hold a portion of the fixing member extending from the lock path exit.

In some embodiments, the slack management opening includes a slot on the housing. The slot is shaped to accommodate and retain a slack portion of the fixing member. The slack portion of the fixing member is on the portion of the fixing member extending from the lock path exit. In other embodiments, the slot includes one or more locking sections where each locking section is shaped to hold the slack portion of the fixing member in place in the slot. In other embodiments, each locking section of the one or more locking sections includes a narrowed section of the slot sized for a compression fit of the fixing member into the narrowed section. In other embodiments, each locking section of the one or more locking sections includes a narrowed opening above a portion shaped to accommodate the fixing member where the narrowed opening flexes to allow a user to press the fixing member into the portion shaped to accommodate the fixing member. In other embodiments, each locking section of the one or more locking sections includes teeth. In other embodiments, the one or more locking sections include a locking section at a first end of the slot and a second locking section at a second end of the slot opposite the first end of the slot.

In some embodiments, the fixing member is flexible. In other embodiments, the fixing member includes a stainless-steel cable with a covering. In other embodiments, a first end of the fixing member is attached to the housing and the portion of the fixing member extending from the lock path exit has a second end opposite the first end. In other embodiments, the slack management opening includes an opening through the housing where the opening is different from the lock path. In other embodiments, insertion of the fixing member into the opening holds the locking mechanism in a locked position. In other embodiments, the locking mechanism includes one or more balls and the opening is positioned so the fixing member is positioned in the opening to hold one or more of the one or more balls in a locked position. The locked position prevents movement of the fixing member in at least one direction.

In some embodiments, the slack management opening includes an opening sized to accommodate a slack portion of the portion of the fixing member extending from the lock path exit. The opening is sized to accommodate the slack portion looped into the opening. In other embodiments, the housing includes a metal body with a covering. The covering includes an opening exposing a marking on the metal body. The metal includes stainless steel, steel, zinc-coated steel, and/or aluminum.

Another locking apparatus for wire management includes a housing and a fixing member with a first and a second end opposite the first end. The fixing member is flexible and the first end of the fixing member is attached to the housing. The apparatus includes a locking mechanism within the housing configured to resist movement of the fixing member in a first direction and to allow movement of the fixing member in a second direction opposite the first direction. The apparatus includes a lock path extending from a lock path entrance, through the locking mechanism, to a lock path exit. The apparatus includes a slack management opening integral to the housing and configured to hold a portion of the fixing member extending from the lock path exit. The portion of the fixing member extending from the lock path exit includes the second end of the fixing member.

In some embodiments, the slack management opening includes a slot on the housing the slot is shaped to accommodate and retain a slack portion of the fixing member. The slack portion of the fixing member is on the portion of the fixing member extending from the lock path exit. In other embodiments, the slot includes one or more locking sections where each locking section is shaped to hold the slack portion of fixing member in place in the slot. In other embodiments, the housing includes an opening through the housing. The opening is different from the lock path. Insertion of the fixing member into the opening holds the locking mechanism in a locked position.

Another locking apparatus for wire management includes a housing with a stainless-steel inner portion covered with a covering. The apparatus includes a fixing member with a first and a second end opposite the first end. The fixing member is flexible and the first end of the fixing member is attached to the housing. The apparatus includes a locking mechanism within the housing configured to resist movement of the fixing member in a first direction and to allow movement of the fixing member in a second direction opposite the first direction. The apparatus includes a lock path extending from a lock path entrance, through the locking mechanism to a lock path exit. The apparatus includes a slack management opening integral to the housing and configured to hold a portion of the fixing member extending from the lock path exit. The portion of the fixing member extending from the lock path exit includes the second end of the fixing member. The slack management opening includes a slot on the housing where the slot is shaped to accommodate and retain a slack portion of the fixing member and where the slack portion of the fixing member on the portion of the fixing member extends from the lock path exit, and/or an opening through the housing. The opening is different from the lock path. Insertion of the fixing member into the opening holds the locking mechanism in a locked position.

Another locking apparatus includes a housing, a fixing member, and a locking mechanism within the housing configured to resist movement of the fixing member in a first direction and to allow movement of the fixing member in a second direction opposite the first direction. The locking apparatus includes a lock path extending from a lock path entrance, through the locking mechanism, to a lock path exit.

In some embodiments, the fixing member is flexible. In other embodiments, the fixing member includes a cable. The cable includes a stainless-steel cable or a galvanized steel cable. In other embodiments, the cable includes a coating. In other embodiments, the coating includes a plastic, a polymer, and/or a rubber. In other embodiments, a first end of the fixing member is attached to the housing and a portion of the fixing member opposite the first end includes a second end. The second end is configured to fit in the lock path entrance, to extend through the locking mechanism and out the lock path exit.

In some embodiments, the locking mechanism includes three balls positioned to surround the fixing member extending through the locking mechanism. In other embodiments, the locking mechanism includes a plate where the plate includes a retaining structure for each of three balls shaped to maintain a ball of the three balls in a position against the fixing member, or a spring positioned to push on the plate to maintain pressure on the three balls. In other embodiments, the locking mechanism includes a rolling element and a spring providing a spring force against the rolling element. The rolling element is positioned in a groove in the housing and is angled toward the lock path. The spring is positioned to press the rolling element toward the fixing member inserted into the locking mechanism.

In some embodiments, the housing includes a metallic body or an injection molded body. In other embodiments, the metallic body includes a covering. In other embodiments, the covering includes an electrical insulation material, an ultraviolet ("UV") light-resistant material, and/or a weather-resistant material. In other embodiments, the covering includes an opening exposing a marking on the metallic body. In other embodiments, metal of the metallic body includes stainless-steel, steel, zinc-coated steel, and/or aluminum.

In some embodiments, the locking apparatus includes a slack management opening integral to the housing and configured to hold a portion of the fixing member extending from the lock path exit. In other embodiments, the slack management opening includes an opening through the housing where the opening is different from the lock path, and insertion of the fixing member into the opening holds the locking mechanism in a locked position. The locked position prevents movement of the fixing member in either direction along the lock path. In other embodiments, the slack management opening includes a slot on the housing where the slot is shaped to accommodate and retain a slack portion of the fixing member. The slack portion of the fixing member is on the portion of the fixing member extending from the lock path exit.

Another locking apparatus includes a housing and a fixing member with a first end and a second end opposite the first end. The fixing member includes a cable and the first end of the fixing member is attached to the housing. The locking apparatus includes a locking mechanism within the housing configured to resist movement of the fixing member in a first direction and to allow movement of the fixing member in a second direction opposite the first direction. The locking apparatus includes a lock path extending from a lock path entrance, through the locking mechanism, to a lock path exit.

In some embodiments, the cable is stainless steel covered by a coating comprising a plastic, a polymer, and/or a rubber. The housing includes a metallic body with a covering where metal of the metallic body is stainless-steel, steel, zinc-coated steel, and/or aluminum and the covering includes an electrical insulation material, a UV light-resistant material, and/or a weather-resistant material.

Yet another locking apparatus includes a housing with a metallic inner portion covered with a covering. The locking apparatus includes a fixing member with a first end and a second end opposite the first end. The fixing member is a cable with a coating. The cable is a stainless-steel cable or a galvanized steel cable. The first end of the fixing member is attached to the housing. The locking apparatus includes a locking mechanism within the housing configured to resist movement of the fixing member in a first direction and to allow movement of the fixing member in a second direction opposite the first direction. The locking apparatus includes a lock path extending from a lock path entrance, through the locking mechanism to a lock path exit.

Another locking apparatus includes a housing, a fixing member, a locking mechanism within the housing configured to resist movement of the fixing member in a first direction and to allow movement of the fixing member in a second direction opposite the first direction where the locking mechanism includes one or more rollers. The locking apparatus includes a lock path extending from a lock path entrance, through the locking mechanism, to a lock path exit.

In some embodiments, the locking mechanism includes a roller compartment with the one or more rollers. The roller compartment includes a bottom where the bottom is opposite a top portion. The fixing member extends through the roller compartment in the top portion and the bottom includes a sloped ramp angled upward towards the lock path entrance. In other embodiments, a slope of the sloped ramp is in a range of 10 degrees to 35 degrees. In other embodiments, the slope of the sloped ramp is in a range of 17 degrees to 23 degrees. In other embodiments, the top portion includes an upper channel sized to conform to a portion of the fixing member where a depth of the upper channel is in a range of 5 percent to 50 percent of a height of the fixing member. In other embodiments, the depth of the upper channel is in a range of 25 percent to 35 percent of the height of the fixing member.

In some embodiments, the one or more rollers include one or more textured rollers with a textured outer surface in contact with the fixing member. In other embodiments, a texture pattern of the one or more textured rollers includes a rough surface, an irregular surface, and/or a knurled pattern. The knurled pattern includes raised areas with one of a rounded top, a flat top, and a top with a divot. In other embodiments, the fixing member is a cable with an exterior surface with ridges and valleys and the one or more rollers comprise a knurled pattern with raised areas and a distance between two adjacent raised areas of a roller of the one or more rollers measured in a direction perpendicular to a circumference of the roller is selected to allow a ridge of the cable to fit between the two adjacent raised areas. In other embodiments, the fixing member is a cable and the cable includes a stainless-steel cable or a galvanized steel cable. In other embodiments, the cable includes a coating and the coating includes a plastic, a polymer, and/or a rubber. In other embodiments, a first end of the fixing member is attached to the housing and a portion of the fixing member opposite the first end is a second end and the second end is configured to fit in the lock path entrance, to extend through the locking mechanism and out the lock path exit.

In some embodiments, the housing includes a metallic body or an injection molded body. In other embodiments, the metallic body includes a covering. In other embodiments, the locking apparatus includes a slack management opening integral to the housing and configured to hold a portion of the fixing member extending from the lock path exit. In other embodiments, the slack management opening includes an opening through the housing where the opening is different from the lock path. In other embodiments, the slack management opening includes a slot on the housing. The slot is shaped to accommodate and retain a slack portion of the fixing member. The slack portion of the fixing member is on the portion of the fixing member extending from the lock path exit.

Another locking apparatus includes a housing and a fixing member with a first end and a second end opposite the first end where the fixing member includes a cable and the first end of the fixing member is attached to the housing. The locking apparatus includes a locking mechanism within the housing configured to resist movement of the fixing member in a first direction and to allow movement of the fixing member in a second direction opposite the first direction. The locking mechanism includes a textured roller. A lock path extends from a lock path entrance, through the locking mechanism, to a lock path exit.

In some embodiments, the locking mechanism includes a roller compartment with the knurled roller. The roller compartment includes a bottom. The bottom is opposite a top portion where the fixing member extends through the roller compartment in the top portion and the bottom has a sloped ramp angled upward towards the lock path entrance. The top portion includes an upper channel sized to conform to a portion of the cable. A depth of the upper channel is in a range of 25 percent to 35 percent of a diameter of the cable.

Another locking apparatus includes a housing and a fixing member with a first end and a second end opposite the first end. The fixing member includes a cable and the first end of the fixing member is attached to the housing. The locking apparatus includes locking mechanism within the housing configured to resist movement of the fixing member in a first direction and to allow movement of the fixing member in a second direction opposite the first direction. The locking mechanism includes a roller compartment with a textured roller. The roller compartment includes a bottom where the bottom is opposite a top portion. The fixing member extends through the roller compartment in the top portion and the bottom includes a sloped ramp angled upward towards a lock path entrance. A slope of the sloped ramp is in a range of 10 degrees to 35 degrees, and the top portion includes an upper channel sized to conform to a portion of the cable. A depth of the upper channel is in a range of 25 percent to 35 percent of a diameter of the cable. A lock path extends from the lock path entrance, through the locking mechanism, to a lock path exit.

FIG. 1 is a perspective section view illustrating a locking apparatus 100 with a housing 102 with a three-ball locking mechanism 104 and a fixing member 106 connected to the housing 102, according to various embodiments. The locking apparatus 100 is configured to allow the fixing member 106 to surround cables, a structure, etc. and the locking mechanism 104 allows the fixing member 106 to move in a first direction 108 and resist or prevent movement in a second direction 110 opposite the first direction 108.

In some embodiments, the locking apparatus 100 is configured to be used with wiring from a photovoltaic ("PV") solar panel system. Where the locking apparatus 100 is used for a PV solar panel system, the locking apparatus 100 is typically installed outside and is exposed to sun, wind, rain, snow, etc. and is typically expected to last for a long period of time, such as 20 to 40 years.

In some embodiments, the fixing member 106 is flexible. In some embodiments, the fixing member 106 has a cross section that is round, such as a rod, a cable, etc. In other embodiments, the fixing member 106 has a cross section that is square, rectangular, oval, or other shape. In the embodiments of FIG. 1, the fixing member 106 is round. A fixing member 106 that is round, in some embodiments, is a cable. The cable may be stainless steel, steel, zinc-coated steel, aluminum, etc. In some embodiments, the fixing member 106 is coated with a material that further prevents degradation. The coating material, in some embodiments, is a plastic. In some embodiments, the plastic is ultraviolet ("UV") light resistant, freeze resistant, heat resistant, etc. and is designed to not degrade over the expected life of the locking apparatus 100. In some embodiments, the fixing member 106 is stainless-steel with a UV and weather resistant plastic coating.

In the embodiments of FIG. 1, only a portion of the fixing member 106 is depicted. The fixing member 106 is configured to extend around an object, cables, wires, a structure, etc. or a combination thereof and then extend through a lock path 112 that includes a lock path entrance 114, a pathway through the locking mechanism 104, and to a lock path exit 116. The locking mechanism 104 is designed to allow the fixing member 106 to move through the locking mechanism 104 in a first direction 108 and to resist or prevent movement of the fixing member 106 in a second direction 110 opposite the first direction 108.

In some embodiments, a first end 118 of the fixing member 106 is attached to the housing 102 at an attachment point on the housing 102. In the embodiments, the fixing member 106 is flexible and a second end (not shown) of the fixing member 106 is inserted in the lock path entrance 114 and into the locking mechanism 104. Further insertion of the second end of the fixing member 106 extends the fixing member 106 through the locking mechanism 104 and out the lock path exit 116. Further insertion of the fixing member 106 into the lock path 112 tightens the fixing member 106 around a structure, wiring, etc. The unidirectional nature of the locking mechanism 104 allows the fixing member 106 to be cinched tight around whatever is surrounded by the fixing member 106.

In the embodiments depicted in FIG. 1, the locking mechanism 104 is a three-ball locking mechanism that includes three balls 120 placed in slots that narrow toward the lock path entrance 114. As the three balls 120 are pushed in the direction of the lock path entrance 114, the three balls 120 move closer together and into the fixing member 106. Force applied to the fixing member 106 in the second direction 110 causes the three balls 120 to move in the second direction 110 and against the fixing member 106, which causes a resistance to movement of the fixing member 106 in the second direction 110.

The locking mechanism 104 of FIG. 1 includes a spring 122 that pushes against a plate 124. The plate 124 includes a hole to accommodate the fixing member 106. The plate 124 is against the three balls 120 and the spring 122 pushes on the plate 124 to keep pressure on the three balls 120, which enables resistance of movement of the fixing member 106 in the second direction 110. In some embodiments, the plate 124 includes a retaining structure 126 for each of the three balls 120. The retaining structure 126 for a ball 120, in various embodiments, includes a cup shape, a dent in the plate 124, or the like to retain a ball 120.

When the fixing member 106 is moved in the first direction 108, the three balls 120 move in the first direction 108 and the slots containing each of the three balls 120 widen to reduce pressure on the fixing member 106, which allows movement of the fixing member 106 in the first direction 108.

While a lower half of the housing 102 is depicted in FIG. 1, it is understood that a similar upper half of the housing 102 is also included with the overall housing 102. The housing 102, in some embodiments, includes a metallic body 128. In some embodiments, the three balls 120, retaining structure 126, plate 124, spring, etc. are metal. In some embodiments, the metal is stainless steel, zinc-coated steel, aluminum, or similar metal chosen to last for the life of the locking apparatus 100. In some embodiments, the metal is chosen to not corrode, rust, etc. when exposed to water, wind, sun, etc.

In some embodiments, the metallic body 128 of the housing 102 includes a covering 130. The covering 130, in some embodiments, is chosen to further reduce wear, corrosion, etc. of the locking apparatus 100. In some embodiments, the covering 130 provides electrical insulation between the metallic body 128 and any electrified component external to the locking apparatus 100. In some embodiments, the covering 130 is a plastic. In other embodiments, the covering 130 is a rubber. In other embodiments, the covering 130 is a polymer. In some embodiments, the material for the covering 130 is chosen to last for a desired lifetime of the locking apparatus 100 while being exposed to UV light, water, temperature extremes, wind, sunlight, etc. One of skill in the art will recognize other materials suitable for the covering 130.

As used herein components, arrows, etc. in different figures with like numbers are substantially similar but may have slight differences as explained.

Figure 2A:
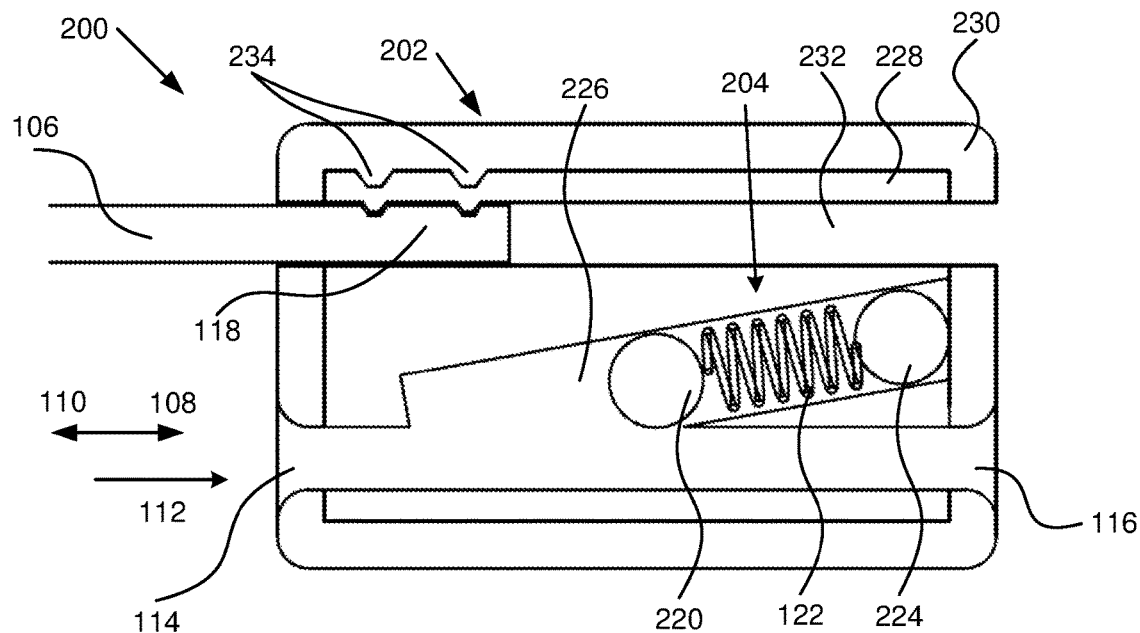
FIG. 2A is a side section view illustrating a locking apparatus with a housing with a one-ball locking mechanism in a first position and a fixing member connected to the housing, according to various embodiments.
Figure 2B:
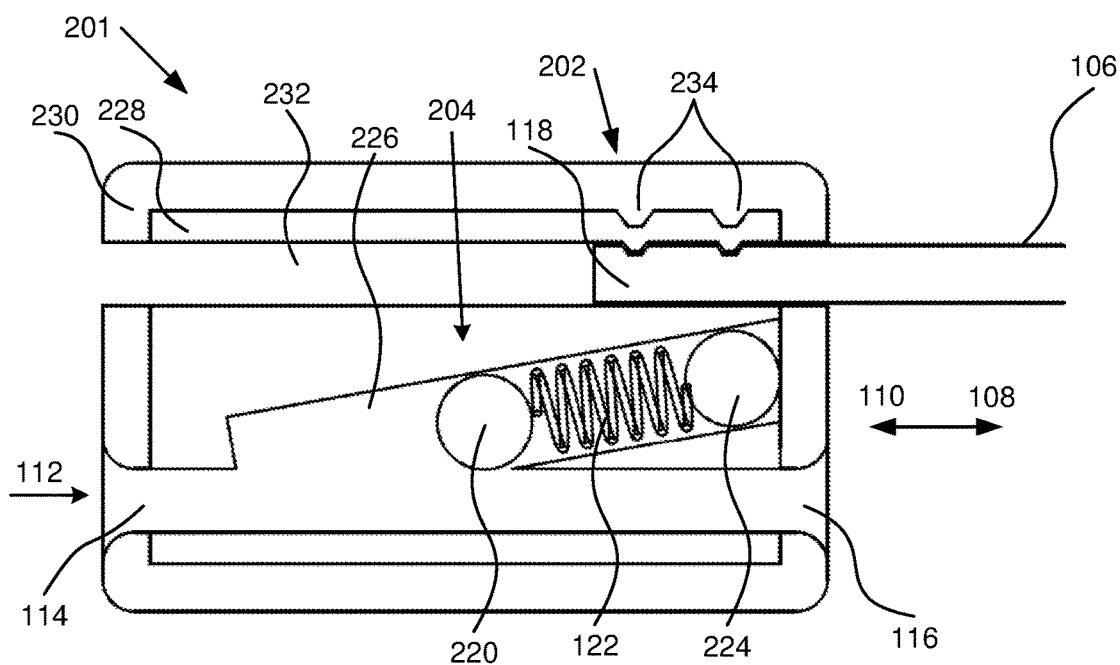
FIG. 2B is a side section view illustrating a locking apparatus with a housing with a one-ball locking mechanism in a second position and a fixing member connected to the housing, according to various embodiments.

FIG. 2A is a side section view illustrating a locking apparatus 200 with a housing 202 with a one-ball locking mechanism 204 in a first position and a fixing member 106 connected to the housing 202, according to various embodiments. FIG. 2B is a side section view illustrating a locking apparatus 201 with a housing 202 with a one-ball locking mechanism 204 in a second position and a fixing member 106 connected to the housing 202, according to various embodiments. The locking apparatus 201 of FIG. 2B is the same as the locking apparatus 200 of FIG. 2A except the fixing member 106 has a first end 118 at an opposite end of the housing 202 than the fixing member 106 of FIG. 2A. The one-ball locking mechanism 204 of FIGS. 2A and 2B operate similar to the three-ball locking mechanism 104 of FIG. 1.

As with the locking apparatus 100 of FIG. 1, the locking apparatus 200 of FIG. 2A is configured to allow the fixing member 106 to surround cables, a structure, etc. and the locking mechanism 204 allows the fixing member 106 to move in a first direction 108 and resist or prevent movement in a second direction 110 opposite the first direction 108. The fixing member 106 of the locking apparatus 200 of FIG. 2 may be flexible as in FIG. 1 or may be rigid and may be attached or detached from the housing 202. The locking apparatus 200 of FIG. 2 is depicted as being attached to the housing 202 at a first end 118 of the fixing member 106.

The fixing member 106 is inserted into the housing 202 through a lock path 112 that includes a lock path entrance 114 and a lock path exit 116 and the lock path 112 extends through the locking mechanism 204. The locking mechanism 204 includes a first ball 220 in a sloped cylinder 226 to impinge on the fixing member 106. A spring 122 presses on the first ball 220. In some embodiments, the locking mechanism 204 of FIG. 2A includes a second ball 224 at an end of the cylinder 226. In other embodiments, the spring 122 is configured to rest against the end of the cylinder 226. In some embodiments, the housing 202 includes an inner metallic body 228. In other embodiments, the inner metallic body 228 includes an outer covering 230. The metallic body 228 and outer covering 230 are substantially similar to the metallic body 128 and covering 130 of the locking apparatus 100 of FIG. 1.

The housing 202 of FIGS. 2A and 2B include an opening 232 for the fixing member 106 extending through the housing 202, which, in some embodiments, is for convenience during manufacturing. In other embodiments, the opening 232 does not extend through the housing 202 but instead is a depth to hold the first end 118 of the fixing member 106 and is positioned in the housing 202 based on an intended function. In FIGS. 2A and 2B, the fixing member 106 can be inserted into either end of the opening 232 and crimped into place. Crimping marks 234 are depicted in FIGS. 2A and 2B. In other embodiments, the fixing member 106 is rigid and is not attached to the housing 202 at the first end but is instead U-shaped. The rigid fixing member 106 may then be looped around something and a second end of the fixing member 106 is inserted into the lock path 112 and pushed into the lock path 112 until a portion of the first end 118 of the fixing member 106 is inserted into the opening 232. In other embodiments, the rigid fixing member 106 is first inserted into the opening 232 and pushed further into the opening 232 until an end of the rigid fixing member 106 enters the lock path 112 and extends through the locking mechanism 104.

Figure 3:
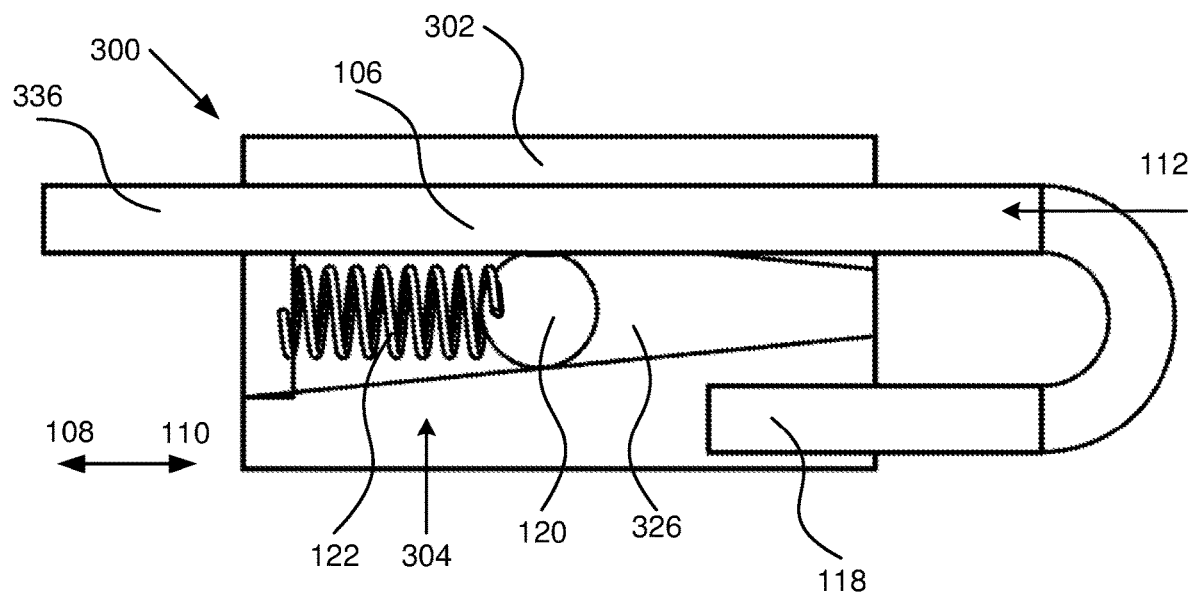
FIG. 3 is a side section view illustrating a locking apparatus with a housing with a one-ball locking mechanism and a first end of a fixing member connected to the housing and a second end of the fixing member extending through a lock path that includes the locking mechanism, according to various embodiments.

FIG. 3 is a side section view illustrating a locking apparatus 300 with a housing 302 with a one-ball locking mechanism 304 and a first end 118 of a fixing member 106 connected to the housing 302 and a second end 336 of the fixing member 106 extending through a lock path 112 that includes the locking mechanism 304, according to various embodiments. The one-ball locking mechanism 304 of FIG. 3 functions similar to the one-ball locking mechanism 204 of FIGS. 2A and 2B and include a ball 120, a spring 122, and a sloped cylinder 326 or similar shape.

In some embodiments, the fixing member 106 is flexible and is attached to the housing 302 at a first end 118 while a second end 336 is pushed through a lock path 112. In other embodiments, the fixing member 106 is rigid and the second end 336 of the fixing member 106 is first inserted into the lock path 112 and pushed until the first end 118 of the fixing member 106 is inserted into a hole in the housing 302. The fixing member 106 is able to be inserted in a first direction 108 into the lock path 112 and the locking mechanism 304 prevents the fixing member 106 from moving in a second direction 110 opposite the first direction 108. While a covering is not shown for the locking apparatus 300 of FIG. 3, in some embodiments the housing 302 includes a covering, which may be similar to the coverings 130 of FIGS. 1, 2A, and 2B.

Figure 4:
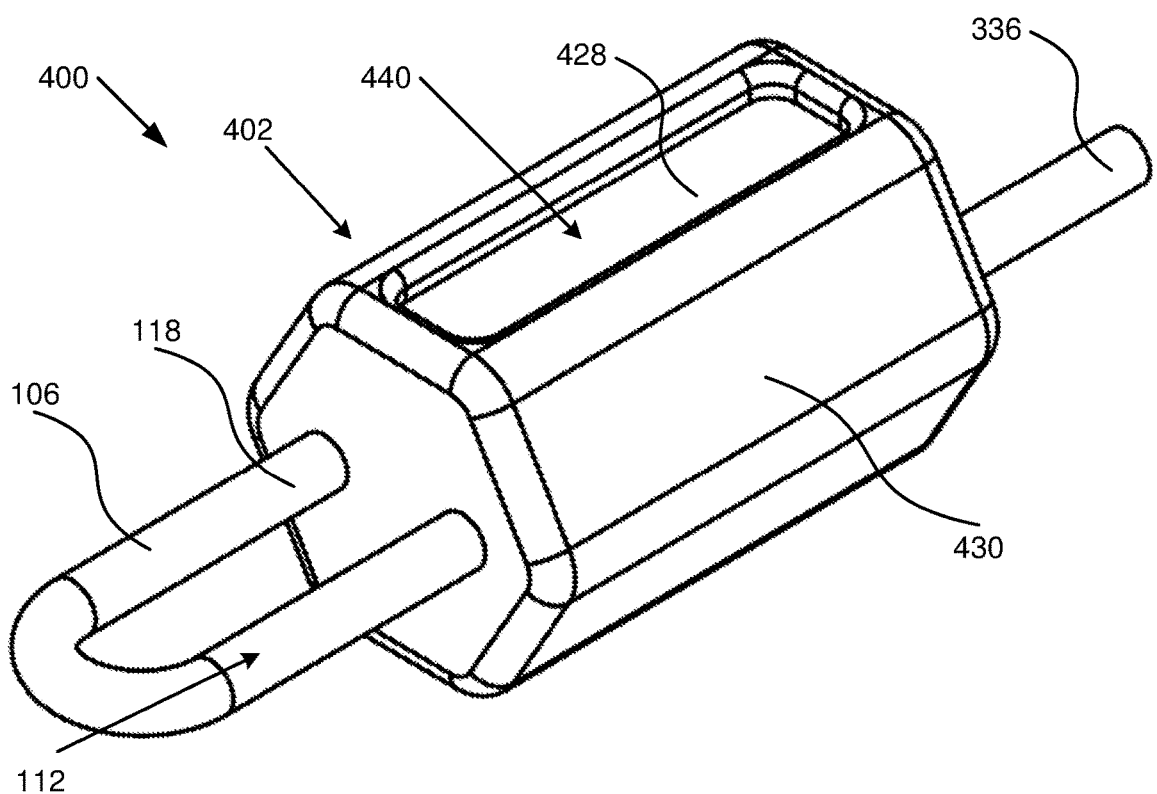
FIG. 4 is a perspective view illustrating a locking apparatus with a first end of a fixing member connected to a housing and a second end of the fixing member extending through a lock path that includes a locking mechanism and an opening in a covering exposing a metallic portion of the housing, according to various embodiments.

FIG. 4 is a perspective view illustrating a locking apparatus 400 with a first end 118 of a fixing member 106 connected to a housing 402 and a second end 336 of the fixing member 106 extending through a lock path 112 that includes a locking mechanism (not shown) and an opening 440 in a covering 430 exposing a metallic body 428 of the housing 402, according to various embodiments. The opening 440 exposing the metallic body 428, in some embodiments, provides a convenient location to imprint a serial number, an identification, or other markings on the metallic portion, which is required in some jurisdictions. In some examples, the metallic body 428 includes an identification required by the National Electrical Code. In some embodiments, the opening 440 is formed when the covering 430 is formed. In other embodiments, the opening 440 is cut out of the covering 430. In some embodiments, the metallic body 428 is substantially similar to the metallic body 128, 228 of FIGS. 1, 2A, and 2B and housing 302 of FIG. 3. While the opening 440 is depicted in a side of the housing 402, in other embodiments the opening 440 is on an end of the housing 402.

Figure 5:
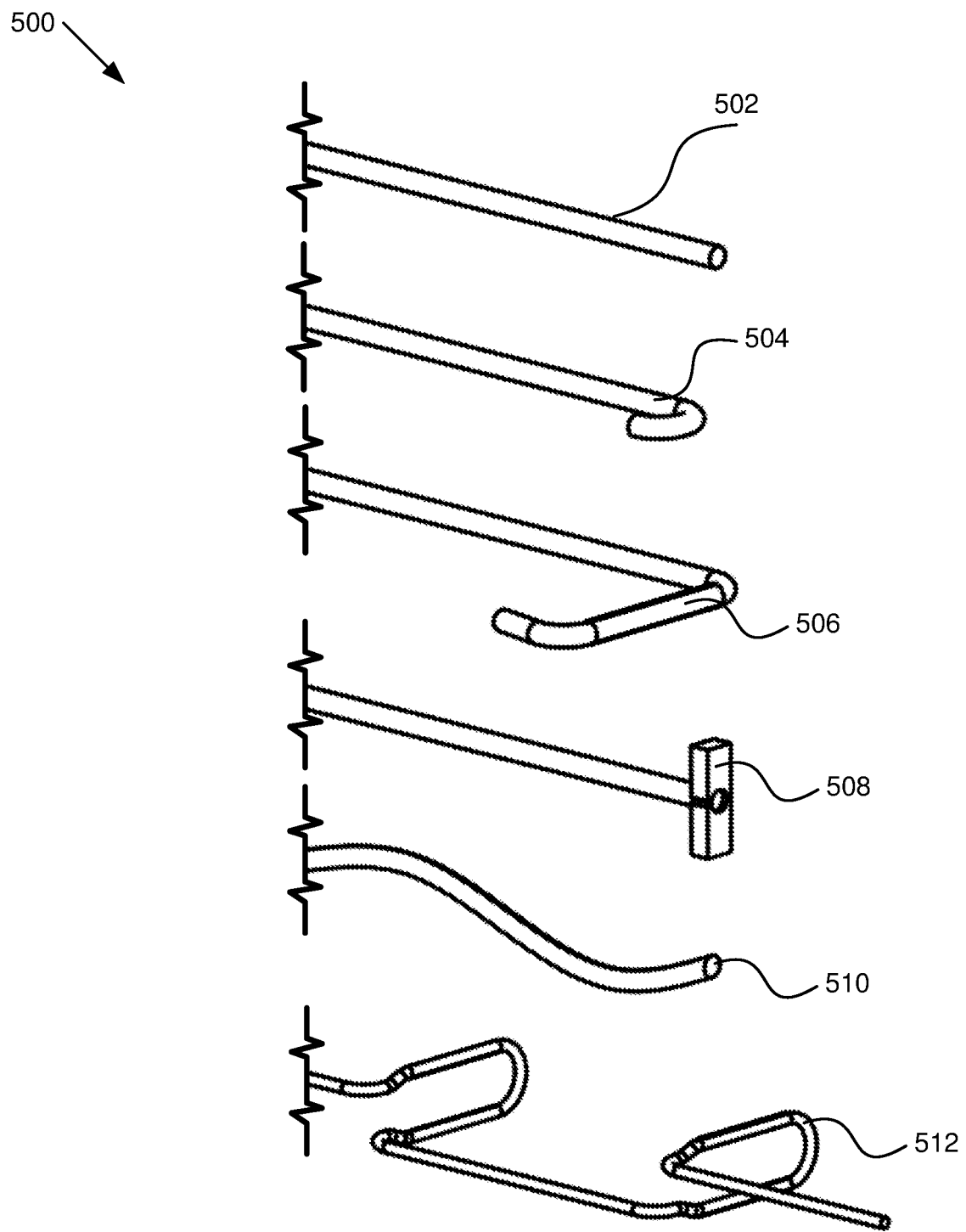
FIG. 5 is a perspective view of various fixing members, according to various embodiments.

FIG. 5 is a perspective view of various fixing members 500, according to various embodiments. A first fixing member 502 is rigid and strait. A second fixing member 504 is rigid and includes a short hook, which may be used to insert back into an opening in a housing, insertion into a drain hole on a solar panel frame, or the like. A third fixing member 506 is rigid and includes a wide hook, which may be used to extend around a structural element or something similar, such as a solar panel frame. A fourth fixing member 508 includes a tab on the end that could be secured in an unused hole in a structure. A fifth fixing member 510 is flexible. A sixth fixing member 512 is rigid and is shaped to form a cable hanger. One of skill in the art will recognize other ways to form a fixing member to be used with a locking apparatus.

Figure 6:
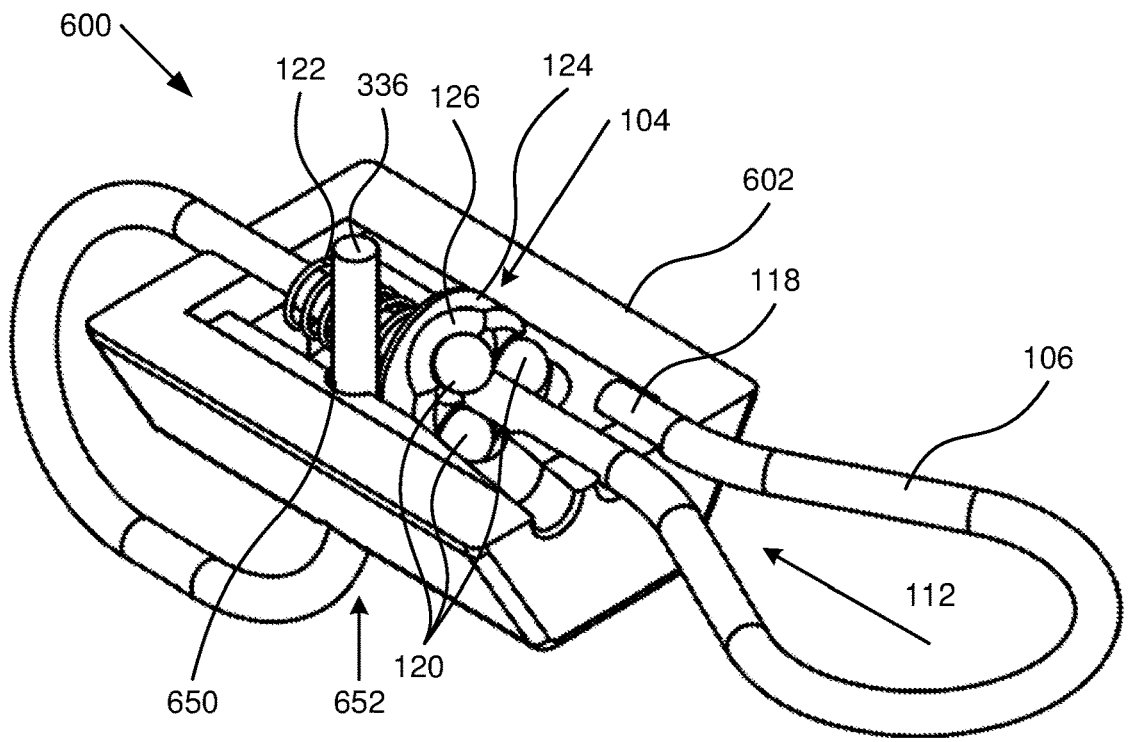
FIG. 6 is a perspective section view illustrating a locking apparatus with a housing with a three-ball locking mechanism and a first end of a fixing member connected to the housing, the fixing member extending through a lock path where the lock path includes the locking mechanism, and a second end of the fixing member extending through an opening that holds the locking mechanism in a locked position, according to various embodiments.

FIG. 6 is a perspective section view illustrating a locking apparatus 600 with a housing 602 with a three-ball locking mechanism 104 and a first end 118 of a fixing member 106 connected to the housing 602, the fixing member 106 extending through a lock path 112 where the lock path 112 includes the locking mechanism 104, and a second end 336 of the fixing member 106 extending through an opening 650 that holds the locking mechanism 104 in a locked position, according to various embodiments. In the locking apparatus 600 of FIG. 6, the locking mechanism 104 is a three-ball locking mechanism 104, which is similar to the three-ball locking mechanism 104 of FIG. 1 and includes three balls 120, a spring 122, a plate 124, and a retaining structure 126. Other locking apparatuses with an opening 650 that holds a locking mechanism in a locked position include different locking mechanisms.

In the locking apparatus 600 of FIG. 6, the fixing member 106 runs through an opening 650 in the housing 602 that is strategically placed to hold the plate 124 in a locked position, which reinforces locking done by the locking mechanism 104. The opening 650 creates a slack cable path 652 that is different from the lock path 112 and when the fixing member 106 is inserted into the slack cable path 652, the locking mechanism 104 is held in a locked position.

In some embodiments, the locking mechanism 104 includes one or more balls 120, such as the three-ball locking mechanism 104 of FIG. 6, and the slack cable path 652 is positioned so the fixing member is positioned in the opening 650 to hold one or more of the one or more balls 120 in a locked position. The locked position prevents movement of the fixing member 106 in at least one direction. In some embodiments, the locked position prevents movement of the fixing member 106 in either direction through the locking path 112.

For locking mechanisms 104 that include a plate 124, in some embodiments, the slack cable path 652 is positioned so that the fixing member 106 runs next to the plate 124 on a side opposite the balls 120 and the fixing member 106 holds the plate 124 in a position so that the balls 120 are wedged against the fixing member 106 in a locked position. In other embodiments, the slack cable path 652 is positioned adjacent to one or more balls 120 so that the balls 120 are wedged against the fixing member 106 in a locked position. In other locking mechanism designs, the slack cable path 652 is positioned near other components that cause a locked position of the locking mechanisms.

While the locking apparatus 600 of FIG. 6 depicts the fixing member 106 extending through the slack cable path 652, other embodiments include other components inserted into a slack cable path 652 or similar slot in the housing 602 to secure the locking mechanism 104, 204, 304, etc. into a locked position. The other component may include a rod, a shaft, a wire, a device connected to a button, or other type of component arranged to hold a plate 124, one or more balls 120, or other element of the locking mechanism 104, 204, 304, etc. into a locked position.

In some embodiments, the slack cable path 652 serves to position a slack portion of the fixing member 106 extending from the lock path exit 116 in a convenient location so that the slack portion is not hanging loose. In some embodiments, the slack cable path 652 serves as all or a portion of a slack management opening.

Figure 7:
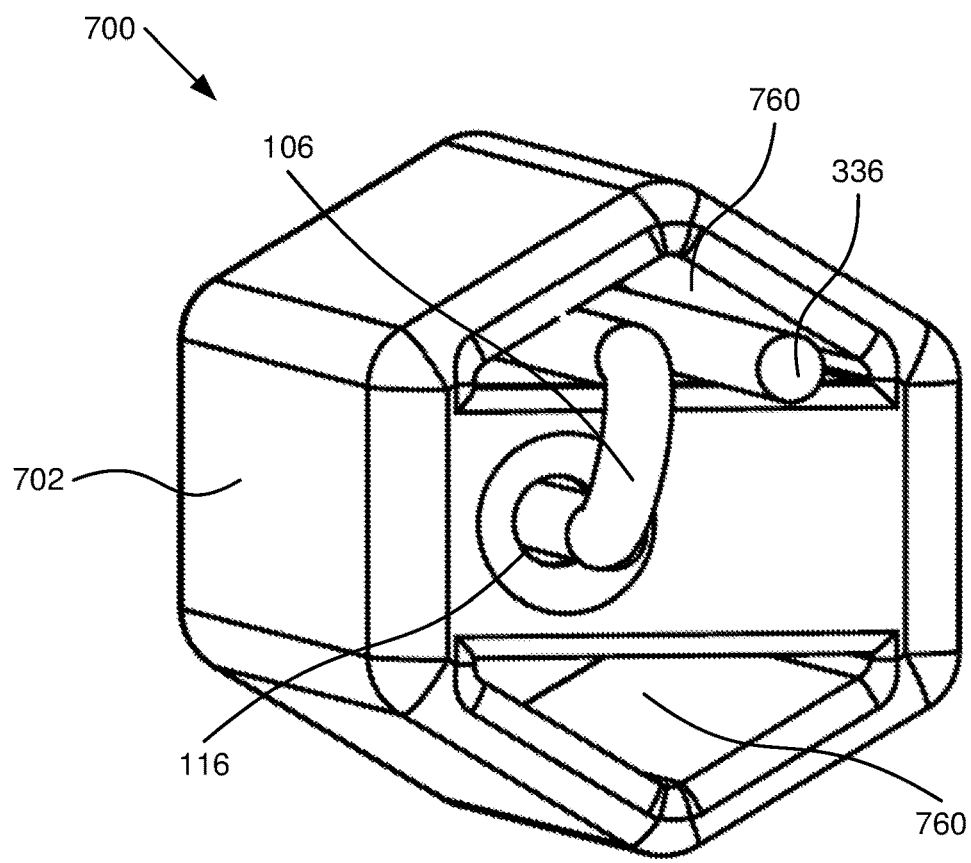
FIG. 7 is a perspective view illustrating a locking apparatus with a housing with a locking mechanism and a fixing member extending through a lock path of the housing and a slack end of the fixing member inserted into one of two triangular slack management openings, according to various embodiments.

FIG. 7 is a perspective view illustrating a locking apparatus 700 with a housing 702 with a locking mechanism (not shown) and a fixing member 106 extending through a lock path of the housing 702 and a slack end of the fixing member 106 inserted into one of two triangular slack management openings 760, according to various embodiments. The locking mechanism may be a three-ball locking mechanism, a one-ball locking mechanism, or other locking mechanism.

The housing 702, in some embodiments, includes a metallic body surrounded by a covering, similar to the metallic bodies 128, 228, 428 and coverings 130, 230, 430 of FIGS. 1, 2A, 2B, 3, 4, and 6 described above.

The housing 702 includes two triangular slack management openings 760 that are useful to manage a slack portion of the fixing member 106 beyond a lock path exit 116. In some embodiments, the triangular slack management openings 760 are sized to allow the slack portion of the fixing member 106 to be folded over and inserted. Where there are two triangular slack management openings 760, parts of the slack portion of the fixing member 106 may be inserted in both triangular slack management openings 760. Beneficially, the triangular slack management openings 760 provide convenient storage of the slack portion of the fixing member 106 without having to cut the slack portion of the fixing member 106. In other embodiments, the slack management openings 760 are of a different shape, such as rectangular, oval, or other convenient shape. In some embodiments, the slack management opening 760 is sized to insert a U-shaped portion of the slack end of the fixing member 106.

Figure 8A:
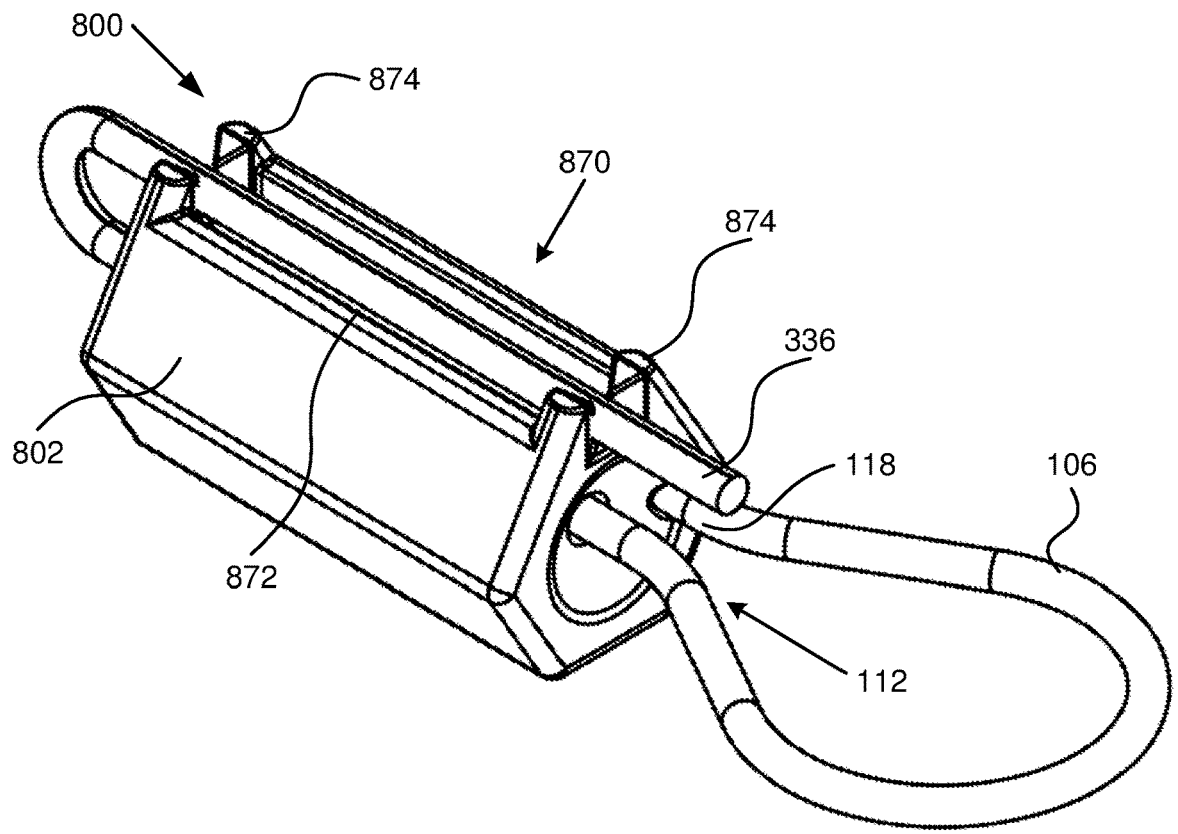
FIG. 8A is a perspective view illustrating a locking apparatus with a housing with a locking mechanism and a fixing member extending through a lock path of the housing and a slack portion of the fixing member inserted into a slack management openings in the form of a slot, according to various embodiments.
Figure 8B:
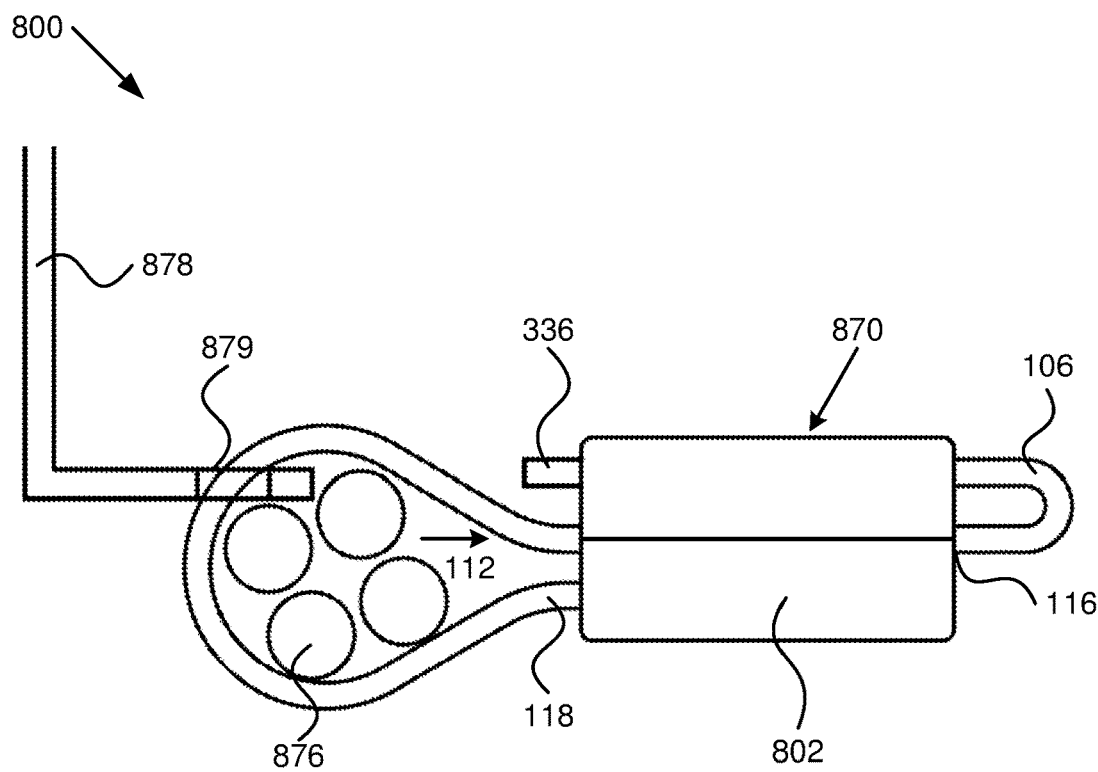
FIG. 8B is a side view illustrating a locking apparatus with a housing with a locking mechanism and a first end of a fixing member attached to the housing wrapping around cables and through a structure and extending through a lock path of the housing and a slack portion of the fixing member inserted through a slack management opening and exiting the housing, according to various embodiments.

FIG. 8A is a perspective view illustrating a locking apparatus 800 with a housing 802 with a locking mechanism and a fixing member 106 extending through a lock path 112 of the housing 802 and a slack portion of the fixing member inserted into a slack management opening 870 in the form of a slack management slot 872, according to various embodiments. FIG. 8B is a side view illustrating a locking apparatus 800 with a housing 802 with a locking mechanism and a first end 118 of a fixing member 106 attached to the housing 802 wrapping around cables 876 and through a structure 878 and extending through a lock path 112 of the housing 802, and a slack portion of the fixing member 106 inserted through a slack management opening 870 and exiting the housing 802, according to various embodiments.

In some embodiments, the slack management opening 870 includes a slack management slot 872 on the housing 802 where the slack management slot 872 is shaped to accommodate and retain a slack portion of the fixing member 106. The slack portion of the fixing member 106 is on a portion of the fixing member 106 extending from the lock path exit 116. The slack management opening 870 is intended to provide a convenient way to handle the slack portion of the fixing member 106 without having to trim off the slack portion.

In some embodiments, the slack management slot 872 includes one or more locking sections 874 where each locking section 874 is shaped to hold the slack portion of the fixing member 106 in place in the slack management slot 872. In the embodiments of FIG. 8A, the slack management opening 870 includes a locking section 874 at each end of the slack management slot 872. In other embodiments, the slack management opening 870 includes one or more additional locking sections 874. Versions of the locking sections 874 are described in more detail with regard to FIGS. 9(a)-(e).

FIG. 8B is a use case showing how the locking apparatus 800 may be used to secure cables to a structure. The locking apparatuses 100, 200, 300, 400, 600, 700 may also be used in a way similar to the locking apparatus 800 of FIG. 8B. In some embodiments with a flexible fixing member 106 attached to the housing 802, the fixing member 106 may then be looped around cables 876 and/or an opening 879 in a structure 878 and then a second end 336 of the fixing member 106 is inserted through a lock path 112 of the housing 802. A slack portion of the fixing member 106 exiting a lock path exit 116 may be pulled to tighten the fixing member 106 around the cables 876 and/or opening 879 of the structure 878. Note that the cables 876 may be electrical wires, communication wires, structural cables, hydraulic lines, flexible or fixed pipes, gas lines, or any other similar element that needs to be cinched together. The fixing member 106 may also be used to anchor cables 876 to a structure 878 of any type, including supports, pipes, beams, structural elements, and the like. One of skill in the art will recognize other cables 876, structures 878, etc. where the locking apparatuses 100, 200, 300, 400, 600, 700, 800 may be used.

As the fixing member 106 is pulled through the lock path 112, the locking mechanism (e.g., 104, 204, 304, etc.) allows the fixing member 106 to be pulled toward the lock path exit 116 without allowing the fixing member 106 to go back in a direction opposite the lock path 112. A slack portion of the fixing member 106 extending from the lock path exit 116 is then hanging free and a user may then insert the slack portion into the slack management opening 870. The slack management opening 870 may be a slack management slot 872 and locking sections 874 as depicted in FIG. 8A, may be a triangular slack management opening 760, or may be a simple opening, such as FIG. 9(e), may be a slack cable path 652, or any other type of opening for managing the slack portion of the fixing member 106.

Figure 9:
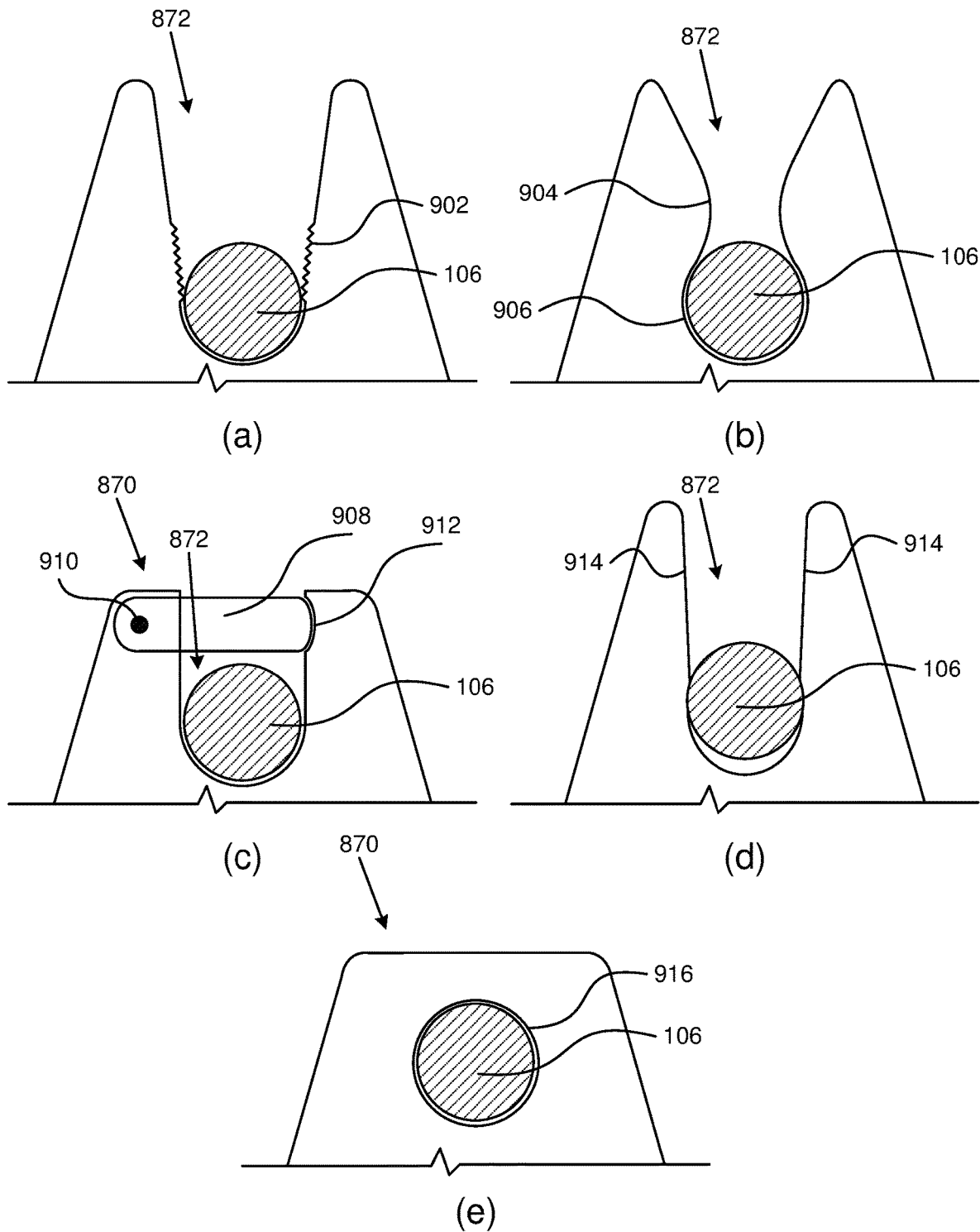
FIG. 9 is an end view of slack management openings, according to various embodiments.

FIG. 9 is an end view of slack management openings 870, according to various embodiments. The slack management openings 870, in various embodiments, are a part of a housing (e.g., 102, 202, 302, 402, 602, 702, 802) of a locking apparatus (e.g., 100, 200, 300, 400, 600, 700, 800). FIG. 9(a) is an end view of embodiments of a slack management opening 870 in the form of a slack management slot 872 with teeth 902 and with a section view of a fixing member 106 inserted in the slack management slot 872. A user presses the fixing member 106 into the slack management slot 872 and the teeth 902 help the fixing member 106 to remain in place. In some embodiments, the teeth 902 are shaped to hold the fixing member 106 without damaging an outer coating of the fixing member 106.

FIG. 9(b) is an end view of a slack management slot 872 with a narrow section 904 above a wider section 906 and with a section view of a fixing member 106 inserted in the slack management slot 872, according to various embodiments. The narrow section 904 and wider section 906 create a narrowed opening above a portion shaped to accommodate the fixing member 106. The narrowed opening, in some embodiments, flexes to allow a user to press the fixing member 106 into the portion shaped to accommodate the fixing member 106.

FIG. 9(c) is an end view of a slack management opening 870 with a cover member 908 in a closed position and with a section view of a fixing member 106 inserted in the slack management opening 870, according to various embodiments. In the embodiments, the cover member 908 is attached to sides of a slack management slot 872 at a hinge point 910, which allows a user to rotate the cover member 908 between an open position and a closed position. One side of the slack management opening 870 includes a depression 912 sized to accommodate an end of the cover member 908. A user inserts a slack portion of the fixing member 106 in the slack management slot 872 and then the user rotates the cover member 908 to a closed position where the end of the cover member 908 opposite the hinge point 910 is in the depression 912, which then retains the slack portion of the fixing member 106.

FIG. 9(d) is an end view of a slack management slot 872 configured for a compression fit of a fixing member 106 inserted in the slack management slot 872, according to various embodiments. In some embodiments, sides 914 of the slack management slot 872 is slightly tapered and is sized for a compression fit of the fixing member 106 into the slack management slot 872. In some embodiments, the sides of the slack management slot 872 deform a cover of the fixing member 106 as the fixing member 106 is pressed into the slack management slot 872. The fixing member 106 pressed into the slack management slot 872, in some embodiments, deforms and/or the sides 914 of the slack management slot 872 flex to provide enough resistance to hold the fixing member 106 in the slack management slot 872.

FIG. 9(e) is an end view of a slack management hole 916 in a housing (e.g., 102, 202, 302, 402, 602, 702, 802) and with a section view of a fixing member 106 inserted in the slack management hole 916, according to various embodiments. In the embodiments, the slack management hole 916 is in an end of the housing 102, 202, 302, 402, 602, 702, 802 and runs in a direction similar to the slack management slot 872 of FIGS. 9(a)-(e). In other embodiments, the housing 102, 202, 302, 402, 602, 702, 802 includes an opening 650 that creates a slack cable path 652 as depicted in FIG. 6 in addition to the slack management hole 916 of FIG. 9(e). One of skill in the art will recognize other types of slack management openings 870.

Figure 10A:
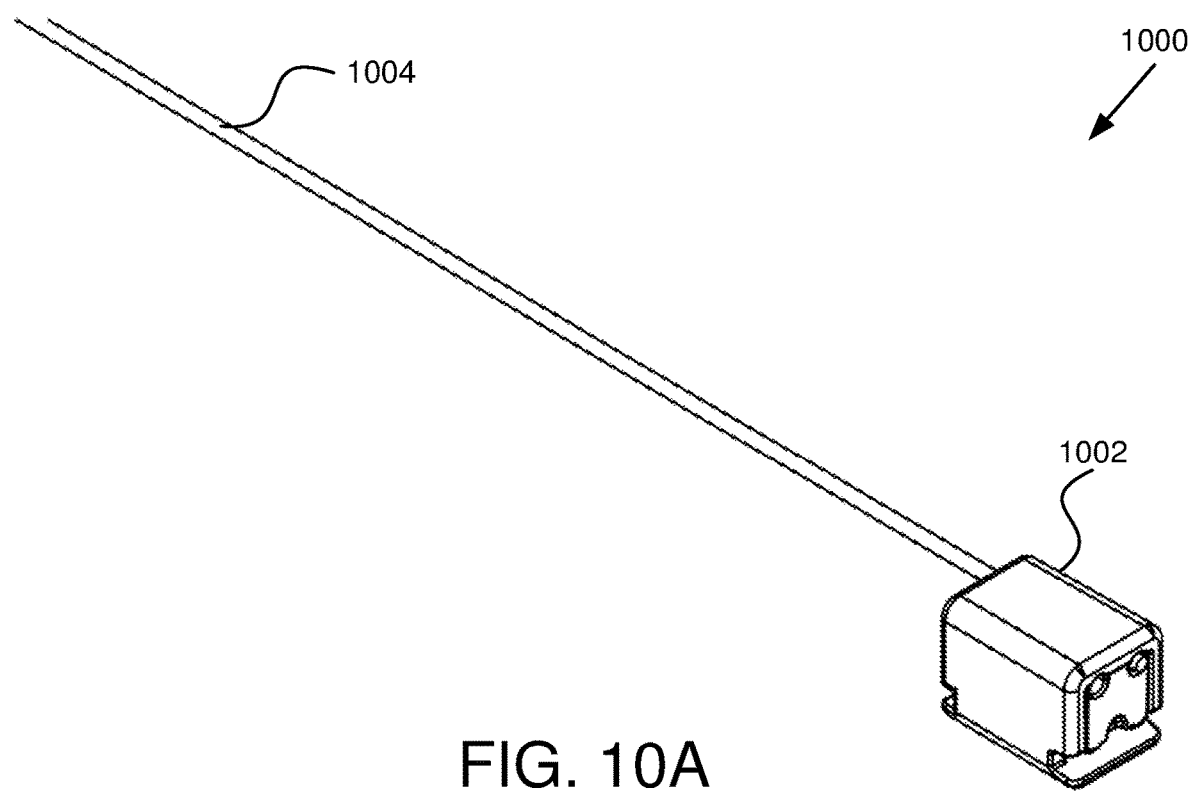
FIG. 10A is a perspective view of another locking apparatus with a housing with a locking mechanism configured to resist a fixing member moving in one direction where the locking mechanism includes one or more rollers, according to various embodiments.

FIG. 10A is a perspective view of another locking apparatus 1000 with a housing 1002 with a locking mechanism configured to resist a fixing member 1004 moving in one direction where the locking mechanism includes one or more rollers, according to various embodiments. The locking apparatus 1000 includes a housing 1002 and a fixing member 1004. The housing 1002 includes a locking mechanism within the housing 1002 configured to resist movement of the fixing member 1004 in a first direction and to allow movement of the fixing member 1004 in a second direction opposite the first direction. In the locking apparatus 1000 of FIG. 10A, the locking mechanism includes one or more rollers. The one or more rollers replace the balls of the locking apparatuses described above and beneficially secures the fixing member 1004 with minimal slippage, lash, or damage to the fixing member 1004. The housing 1002 also includes a lock path extending from a lock path entrance, through the locking mechanism, to a lock path exit. FIG. 10A depicts the fixing member 1004 with one end secured to the housing 1002 and prior to insertion of a second end into the housing 1002 and through the locking mechanism.

Figure 10B:
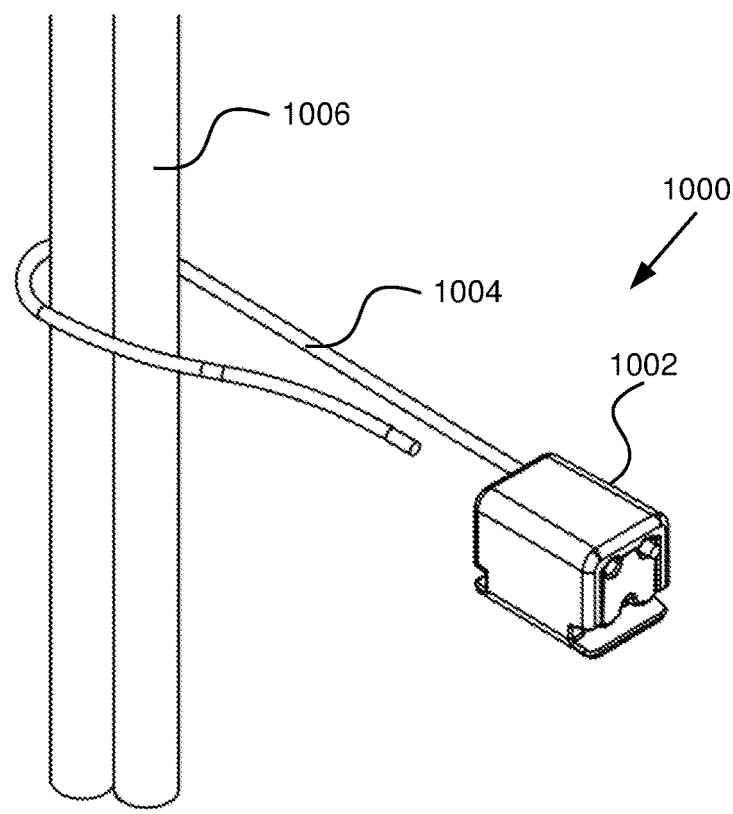
FIG. 10B is a perspective view of the locking apparatus of FIG. 10A where the fixing member is wrapped around items to be secured prior to pulling the fixing member through the housing, according to various embodiments.
Figures 10C, 10D:
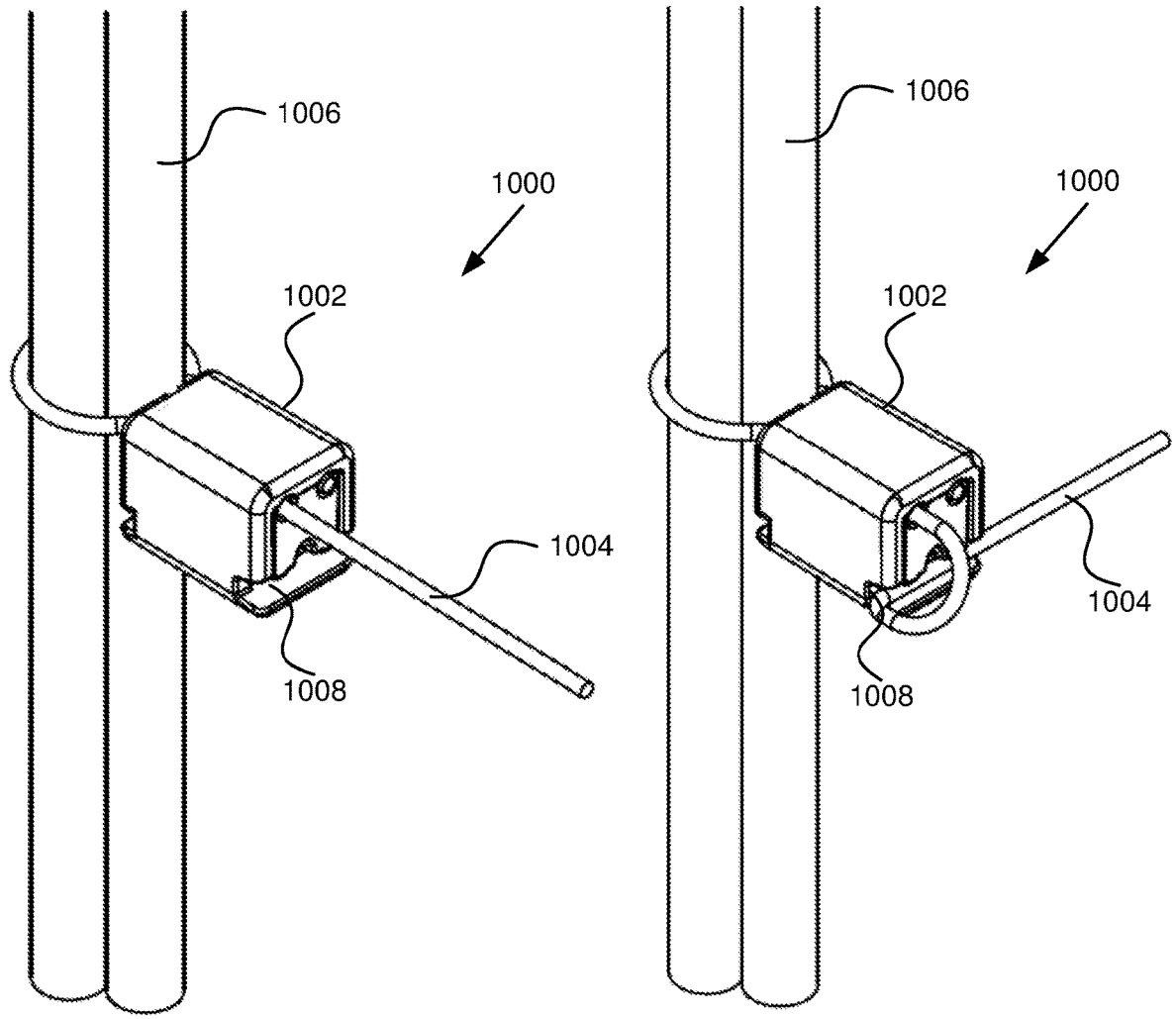
FIG. 10C is a perspective view of the locking apparatus of FIG. 10A where the fixing member is wrapped around items to be secured and inserted through the housing, according to various embodiments.
FIG. 10D is a perspective view of the locking apparatus of FIG. 10A where the fixing member is wrapped around items to be secured and the fixing member is tightened around the items being secured and a portion of the fixing member is inserted in a slack management opening comprising a slot in a housing, according to various embodiments.

FIG. 10B is a perspective view of the locking apparatus 1000 of FIG. 10A where the fixing member 1004 is wrapped around items to be secured 1006 prior to pulling the fixing member 1004 through the housing 1002 and FIG. 10C shows the second end of the fixing member 1004 inserted through the housing 1002. The locking mechanism of the locking apparatus 1000 holds the fixing member 1004 to prevent the fixing member 1004 from loosening from around the items to be secured 1006.

Figure 10E:
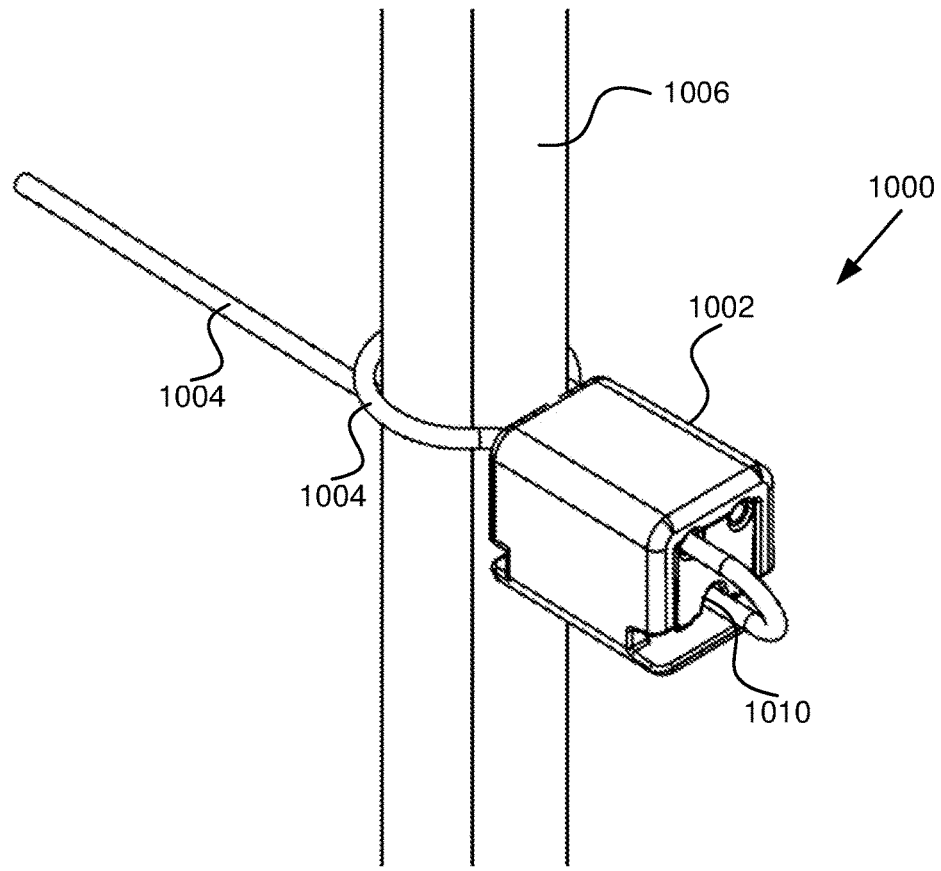
FIG. 10E is a perspective view of the locking apparatus of FIG. 10A where the fixing member is wrapped around items to be secured and the fixing member is tightened around the items being secured and a portion of the fixing member is inserted in a slack management opening extending through a housing, according to various embodiments.
Figure 10F:
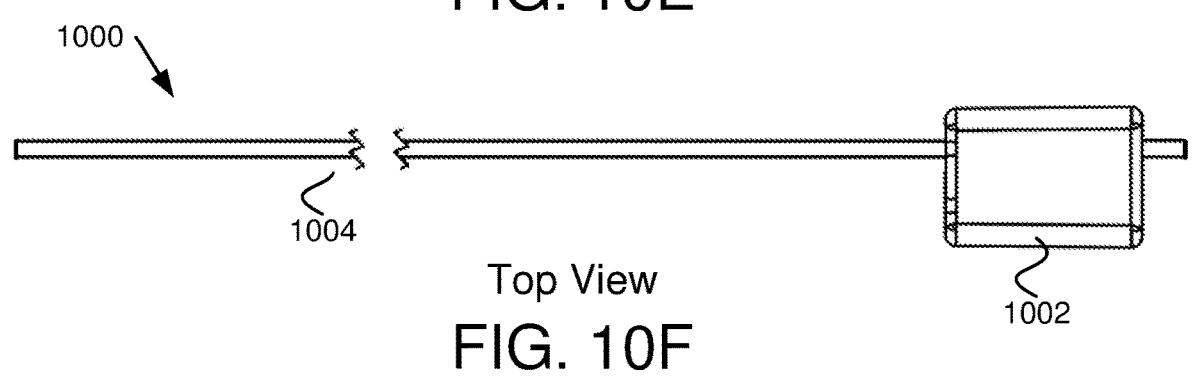
FIG. 10F is a top view of the locking apparatus of FIG. 10A, according to various embodiments.

FIG. 10D includes the free end of the fixing member 1004 extending past the lock path exit inserted in a slack management opening 1008 that includes a slot in the housing 1002, according to various embodiments. FIG. 10E depicts a portion of the fixing member 1004 inserted in a different slack management opening 1010 extending through the housing 1002, according to various embodiments. The slack management slots/opening 1008, 1010 are explained in more detail below. FIG. 10F is a top view of the locking apparatus 1000 of FIG. 10A, according to various embodiments.

Figure 11A:
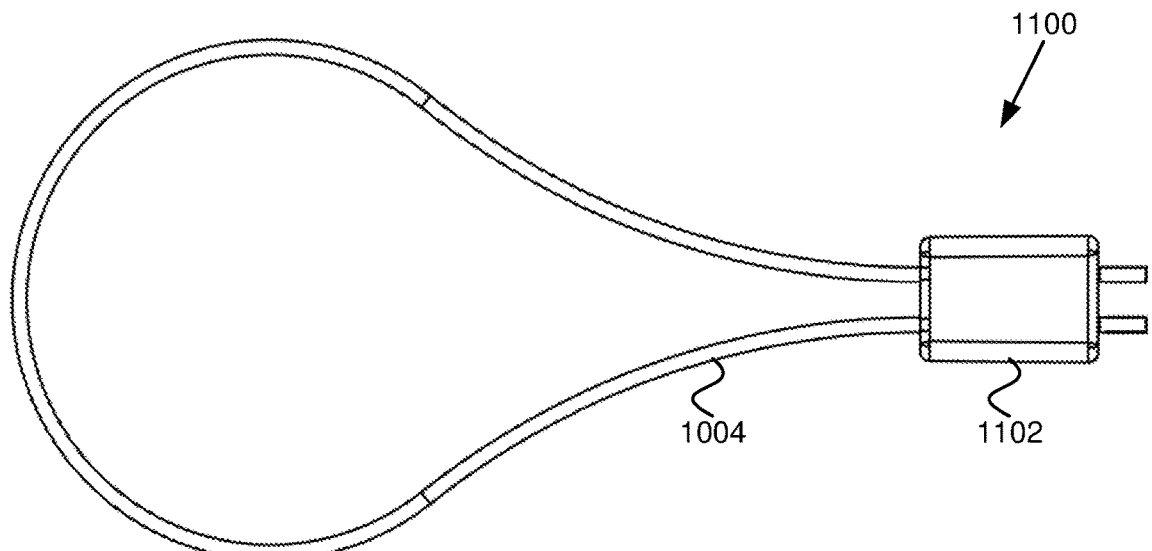
FIG. 11A is a top view of a locking apparatus with two locking mechanisms where the fixing member is looped through both locking mechanisms, according to various embodiments.
Figure 11B:
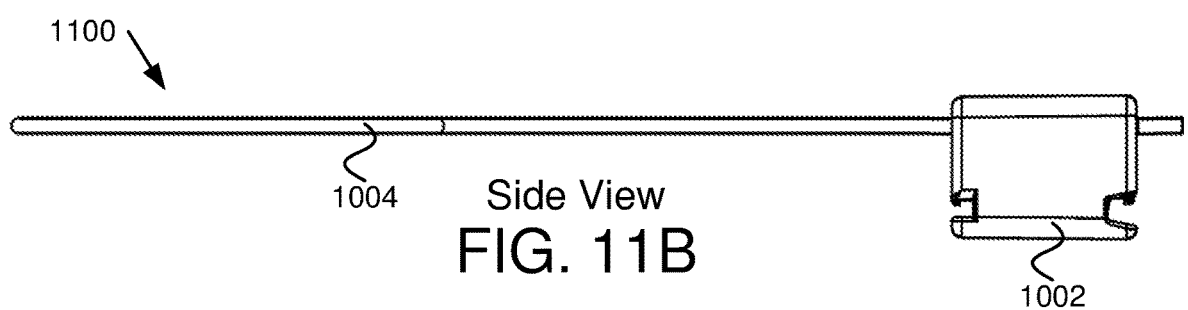
FIG. 11B is a side view of the locking apparatus of FIG. 11A, according to various embodiments.
Figure 11C:
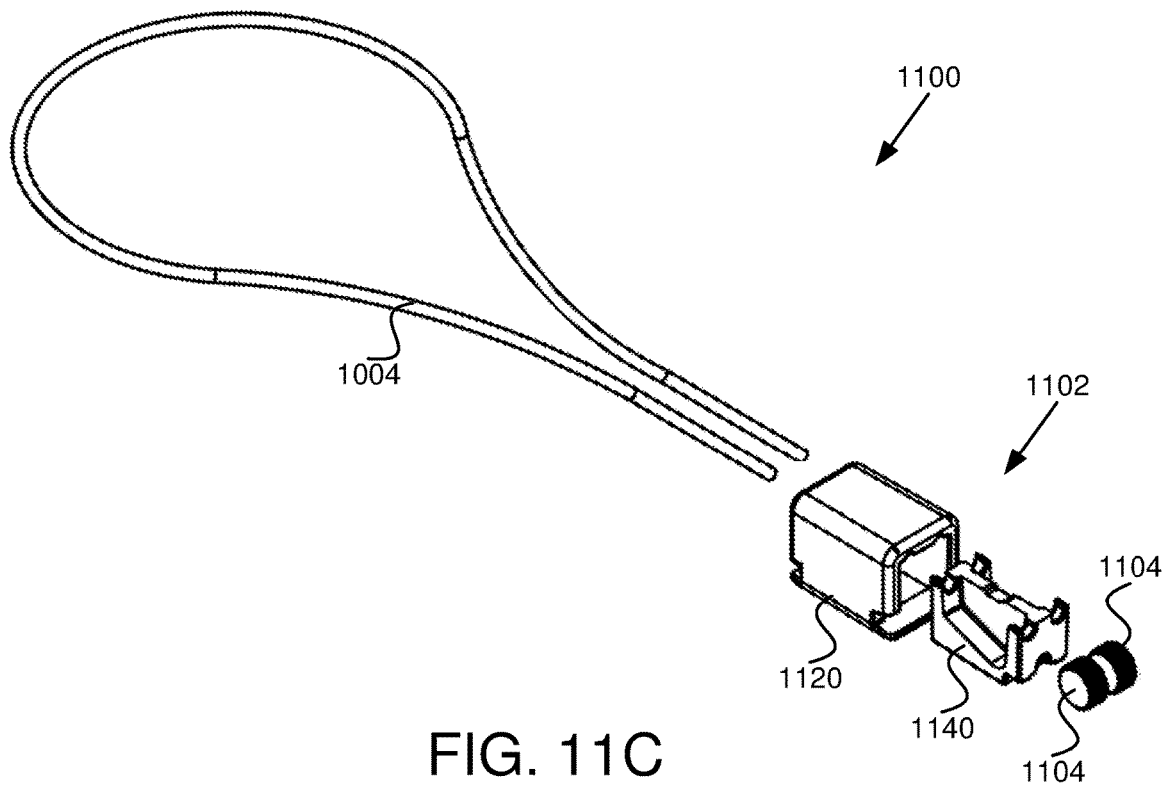
FIG. 11C is an exploded perspective view of the locking apparatus of FIG. 11A, according to various embodiments.

FIG. 11A is a top view of a locking apparatus 1100 with two locking mechanisms where the fixing member 1004 is looped through both locking mechanisms, according to various embodiments. FIG. 11B is a side view of the locking apparatus 1100 of FIG. 11A, according to various embodiments. FIG. 11C is an exploded perspective view of the locking apparatus 1100 of FIG. 11A, according to various embodiments. The locking apparatus 1100 of FIGS. 11A, 11B, and 11C in some embodiments, are the same as the locking apparatus 1000 of FIGS. 10A-F and the fixing apparatus 1104 has been inserted into one locking mechanism. In other embodiments, the locking apparatus 1000 of FIGS. 10A-F includes a single locking mechanism and a first end of the fixing member 1004 is secured to the housing 1002. While the fixing member 1004 of FIGS. 10A-F depict cable, in other embodiments, the fixing member is solid and/or has a different shape and may be similar to those described above in relation to FIG. 5.

The locking apparatus 1100 of FIGS. 11A, 11B, and 11C includes two rollers 1104, an insert 1140, and an exterior housing 1120, which are described in more detail in FIGS. 12, 13A, 13B, 14A, 14B, 14C, 15, 16, and 17. The locking apparatus 1100 allows either end of the fixing member 1004 to be inserted into the housing 1102 and either roller 1104 to engage the fixing member 1004.

Figure 12:
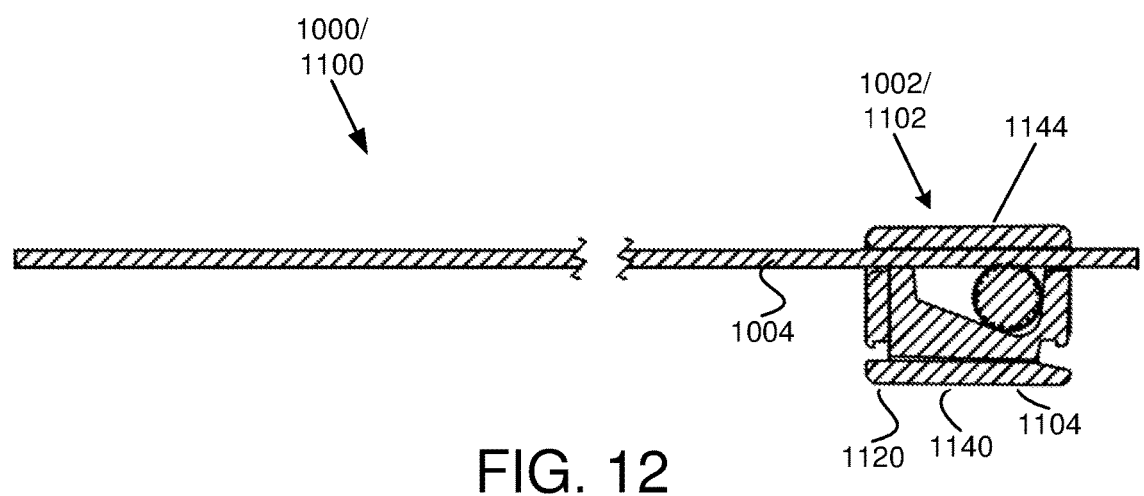
FIG. 12 is a side section view of the locking apparatus of FIG. 10A and/or the locking apparatus of FIG. 11A, according to various embodiments.

FIG. 12 is a side section view of the locking apparatus 1000 of FIG. 10A and/or the locking apparatus 1100 of FIG. 11A, according to various embodiments. The housing includes a roller 1104, which may be a textured roller, the exterior housing 1120 and the insert 1140. FIG. 12 depicts how the insert 1140 fits into the exterior housing 1120 and how the roller 1104 interacts with the fixing member 1004 and the insert 1140. When the fixing member 1004 is inserted on the left side of the housing 1002, 1102 through the locking path entrance, the fixing member 1004 engages the roller 1104, which pushes the roller 1104 to the right and down the ramp 1144 allowing the fixing member 1004 to slide left-to-right (second direction) through the housing 1002/1102. Pulling the fixing member 1004 to the left (first direction) causes the roller 1104 to move to the left up the ramp 1144 wedging the roller 1104 against the fixing member 1004, which prevents the fixing member 1004 from moving from right-to-left (first direction).

Figure 16A:
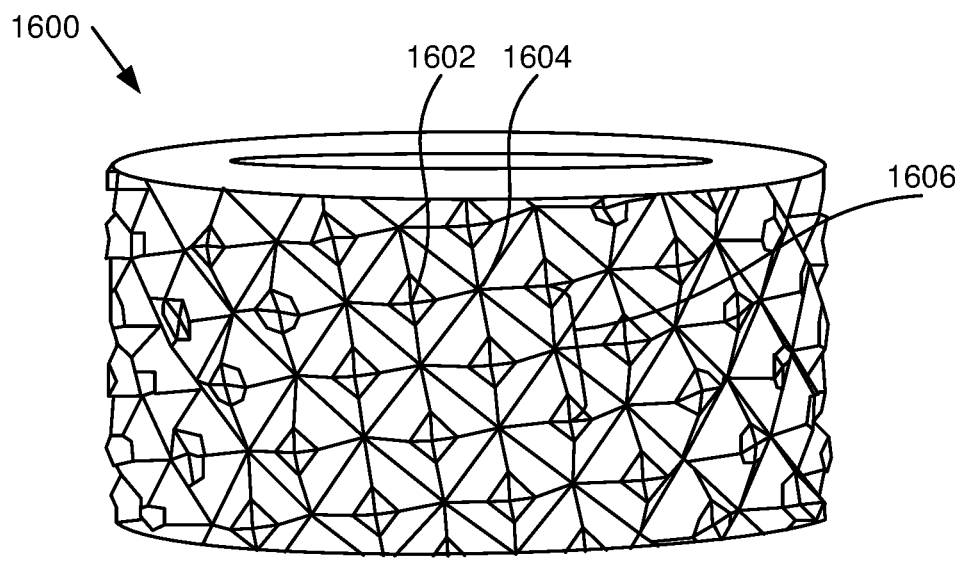
FIG. 16A is a perspective view of a knurled roller of the locking apparatus of FIG. 10A and/or FIG. 11A, according to various embodiments.

In some embodiments, the rollers 1104 are textured rollers that have a textured surface that contacts the fixing member 1004. The textured surface is configured to have a higher resistance than a smooth surface. In some embodiments, the textured rollers 1104 have a rough surface and/or an irregular surface. The rough/irregular surface, in some embodiments, is caused by some type of abrasion, such as sand blasting, etching, etc. In other embodiments, the textured rollers 1104 have a rough surface that is regular. In some examples, the rough surface is caused by stamping, cutting, machining, etc. In some embodiments, the textured surface is a knurled surface using a knurled pattern. In various embodiments, the knurled pattern has raised areas. Experimentation has shown that when using a cable as a fixing member 1004, pointed tips on the raised areas contributes to stripping a coating on the and/or slippage of some types of cable. In some embodiments, the raised areas include a top with a divot, as depicted in FIG. 16A. In other embodiments, the raised areas include a flat top or a rounded top. In various embodiments, the raised areas include a rounded top, a flat top, and/or a top with a divot.

Figure 13A:
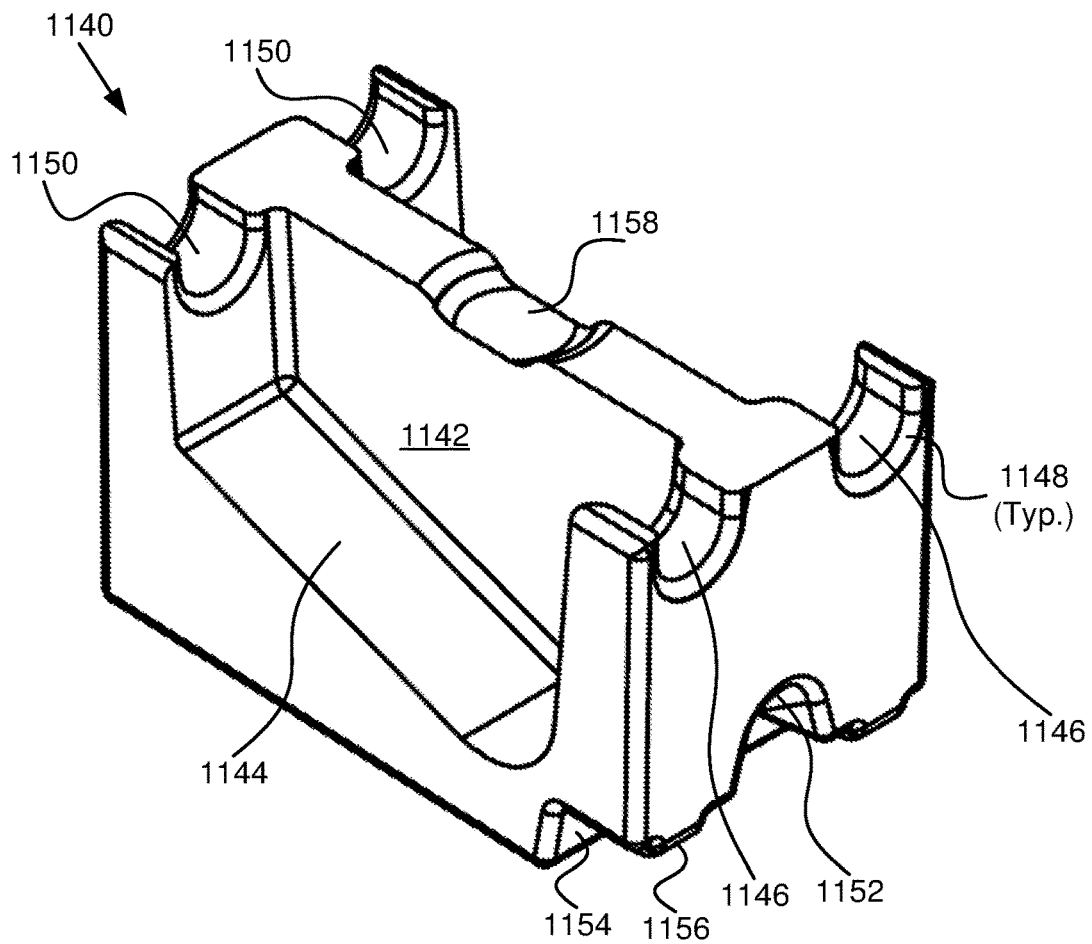
FIG. 13A is a perspective view of an insert of the locking apparatus of FIG. 11A, according to various embodiments.
Figure 13B:
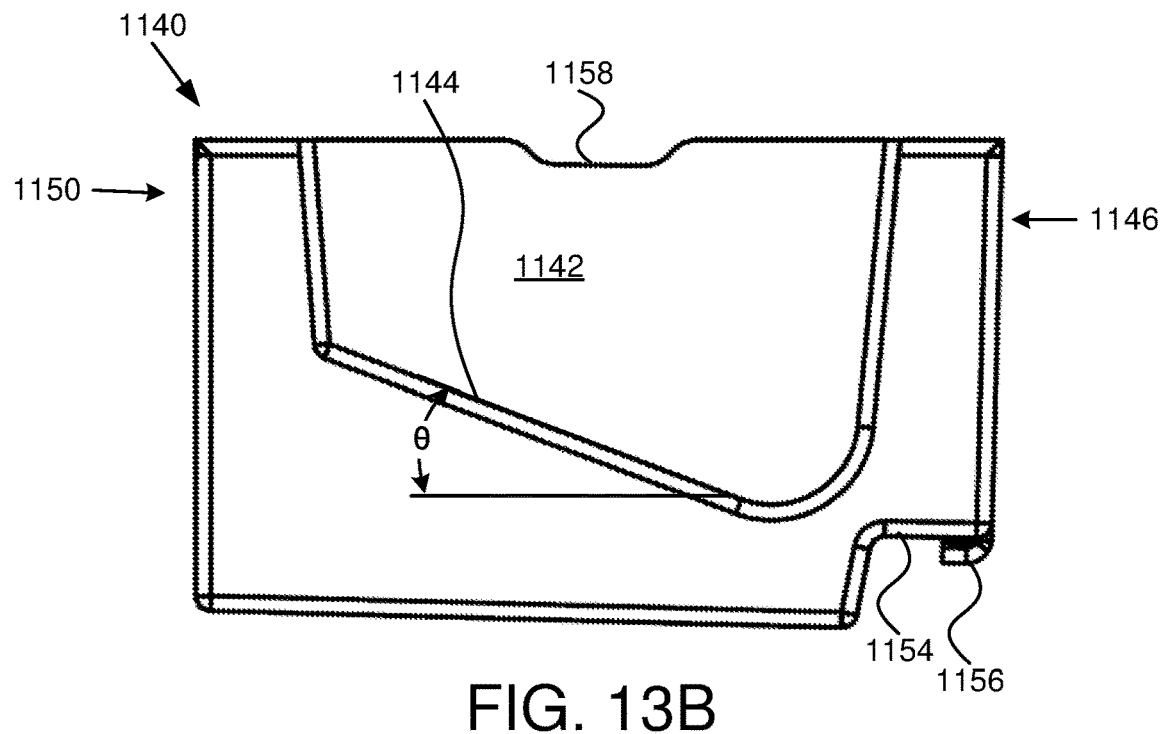
FIG. 13B is a side section view of the insert of FIG. 13A, according to various embodiments.

FIG. 13A is a perspective view of an insert 1140 of the locking apparatus 1100 of FIG. 11A, and FIG. 13B is a side section view of the insert 1140 of FIG. 13A, according to various embodiments. The insert 1140 depicts a roller compartment 1142 which includes a bottom with a sloped ramp 1144. The bottom is opposite a top portion formed by the exterior housing 1120. The sloped ramp 1144 is angled upward towards the lock path entrance, which is partially formed by a lower channel 1150 of the insert 1140. The lower channel 1150, in some embodiments, is sized and shaped to accommodate more than half of the fixing member 1004 while the exterior housing 1120 has an upper channel 1134 sized to accommodate less than half of the fixing member 1004, as will be explained in more detail below with respect to FIG. 14C.

The insert 1140 of FIG. 13A includes two roller compartments 1142 for two rollers 1104 where only a portion of the roller compartment 1142 on the far side of FIG. 13A is depicted. Both roller compartments 1142 include a sloped ramp 1144 sloped up towards a lock path entrance partially formed by the lower channels 1150 of the insert 1140. In other embodiments with a housing 1002 as depicted in FIGS. 10A-F, the insert 1140 includes a single roller compartment 1142 and the fixing member 1004 is secured to the housing 1002. In some embodiments, the fixing member 1004 is secured to the housing 1002 by wedging an end of the fixing member 1004 into upper and lower channels (not shown) formed by the insert 1140 and exterior housing 1120. In other embodiments, the fixing member 1004 is formed into the exterior housing 1120 and/or insert 1140. In other embodiments, the fixing member 1004 is secured to the housing 1002 using an adhesive, melting a portion of the housing 1002 around the fixing member 1004, or other method known to those of skill in the art.

The roller compartment 1142, sloped ramp 1144, lock path entrance and lock path exit formed by the lower channels 1146, 1150 and upper channels 1134, and the roller 1104 combine to form the locking mechanism for the housings 1002, 1102 of FIGS. 10A-F, 11A-C, and 12. The insert 1140 includes the lower channel 1150 of the lock path entrance on the left and a lower channel 1146 of the lock path exit on the right. Both lower channels 1146, 1150 are chamfered 1148 at least on a side where the fixing member 1004 enters the housing 1002, 1102, which improves insertion of the fixing member 1004 and/or decreases a probability of edges of the lower channels 1146, 1150 breaking, chipping, etc. as lateral forces are applied to the fixing member 1004.

The sloped ramp 1144 includes a slope with an angle θ that is chosen to enable locking of the fixing member 1004 when force is applied to the fixing member 1004 in a direction towards the lock path entrance (to the left in FIG. 13B) while providing minimal lash. Lash, as defined herein, is an amount of unwanted movement of the fixing member 1004 in a locking direction towards the lock path entrance (right-to-left in FIG. 13B) after the fixing member 1004 engages the roller 1104. A lower slope leads to more lash while a steeper slope leads to less lash. However, as the angle of the slope of the sloped ramp 1144 increases, the roller 1104 eventually loses effectiveness and fails to wedge against the fixing member 1004.

In some embodiments, the slope of the sloped ramp 1144 is in the range of 10 degrees to 35 degrees. Experimentation with a fixing member 1004 that is a coated steel cable, an optimal slope was found to be about 20 degrees. The optimal slope is where lash is minimized while the slope is low enough to maximize strength of a grip of the roller 1104 on the fixing member 1004. In other embodiments, a more optimal slope of the sloped ramp 1144 is in a range of about 17 degrees to 23 degrees. Different materials and shapes of the fixing member 1004, different shapes, sizes, and resistances of the upper channel 1134, a texture type of the one or more rollers 1104, different knurled patterns, knurled roller sizes, etc. will vary an optimal slope as well as an effective range of the slope of the sloped ramp 1144.

In some embodiments, the slope of the sloped ramp 1144 is designed to include a specified amount of lash, such as 0.3 millimeters. A specified amount of lash is useful to relax the fixing member 1004 enough to avoid damage to a coating on the fixing member 1004 and to prevent damage to wires secured by the locking apparatus 1100. In some embodiments, the specified amount of lash helps to prevent damage to insulation secured by the fixing member 1004 in a situation where a user may over-tighten the fixing member 1004.

In some embodiments, the insert 1140 includes a slack management opening 1152 extending through the insert 1140 and/or exterior housing 1120 that provides a convenient path to feed and/or retain a slack portion of the fixing member 1004. The slack portion of the fixing member 1004 is an end of the fixing member 1004 extending past the lock path exit (partially formed by the lower channel 1146). In other embodiments, the insert 1140 includes one or more slack management openings 1154 in the form of a slot on the exterior of the housing 1002, 1102. The slack management openings 1154 of the insert include tabs 1156 are sized to hold the fixing member 1004 in the slack management openings 1154. A portion of a slack management opening 1154 is depicted in FIGS. 13A and 13B. The slack management slot 1154 includes one or more tabs 1156 extending into the slack management slot 1154 and sized so that the fixing member 1004 can be pressed into the slack management slot 1154. Note that only an upper portion of the slack management slot 1154 is depicted in FIGS. 13A and 13B and a bottom of the slack management slot 1154 is formed by the exterior housing 1120. The size and number of the tabs 1156 along with rigidity, shape, etc. of the fixing member 1004 contribute to a balance between retention of the fixing member 1004 and force required to press the fixing member 1004 into the slack management slot 1154. Another slack management slot 1154 is depicted in FIGS. 14A-C.

An injection molding point 1158 is depicted between roller compartments 1142. The injection molding point 1158 is where material is inserted into a mold for the insert 1140 and may be located at any convenient location. In other embodiments, the insert 1140 includes multiple injection molding points 1158.

Figure 14A:
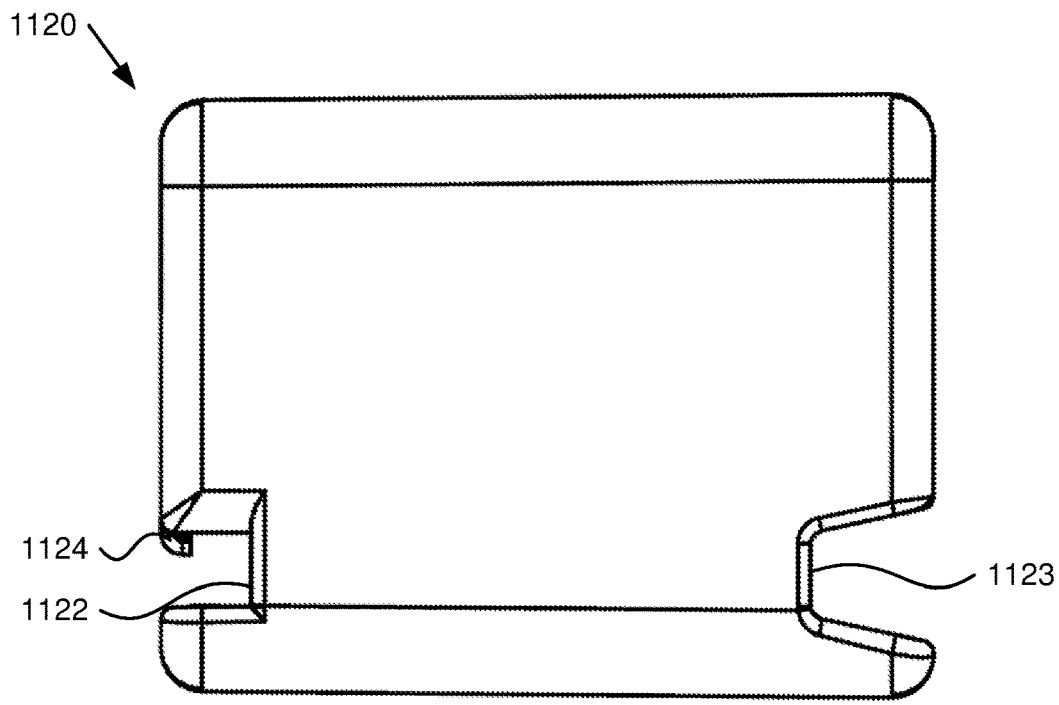
FIG. 14A is a side view of an exterior housing of the locking apparatus of FIG. 10A and/or the locking apparatus of FIG. 11A, according to various embodiments.
Figure 14B:
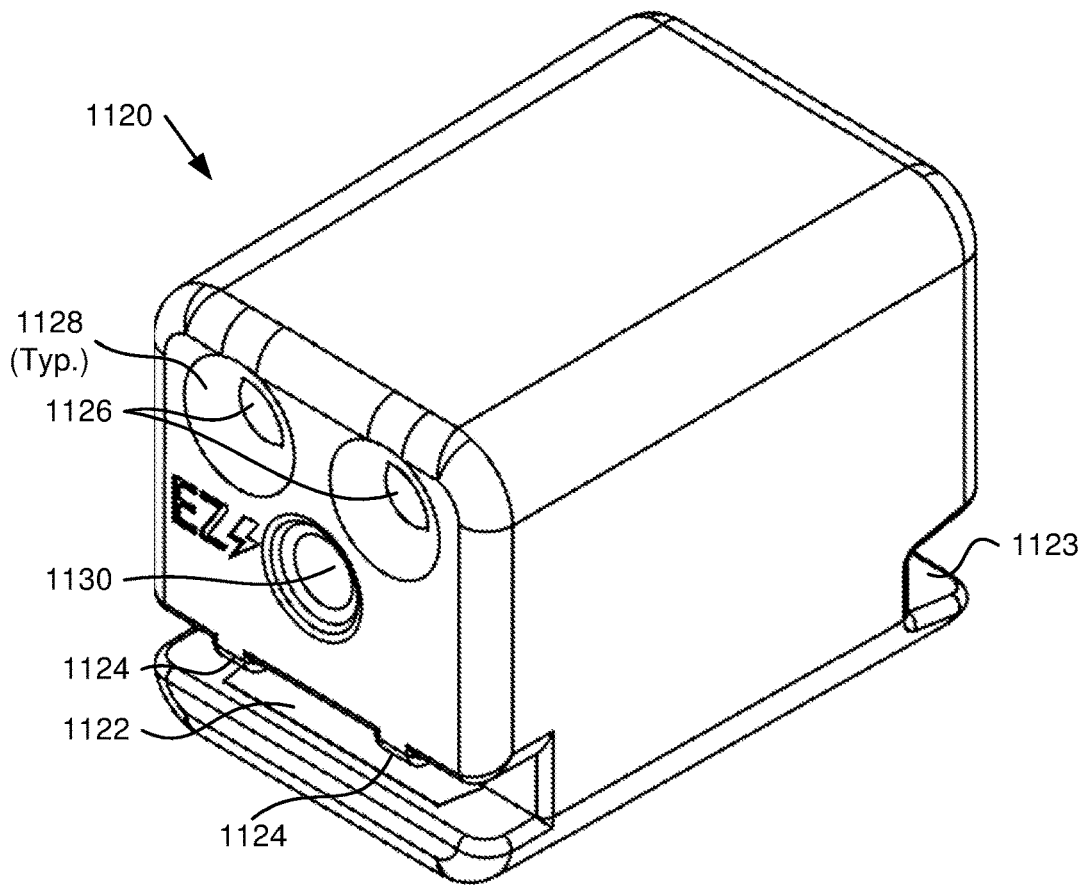
FIG. 14B is a perspective front view of the exterior housing of the locking apparatus of FIG. 11A, according to various embodiments.
Figure 14C:
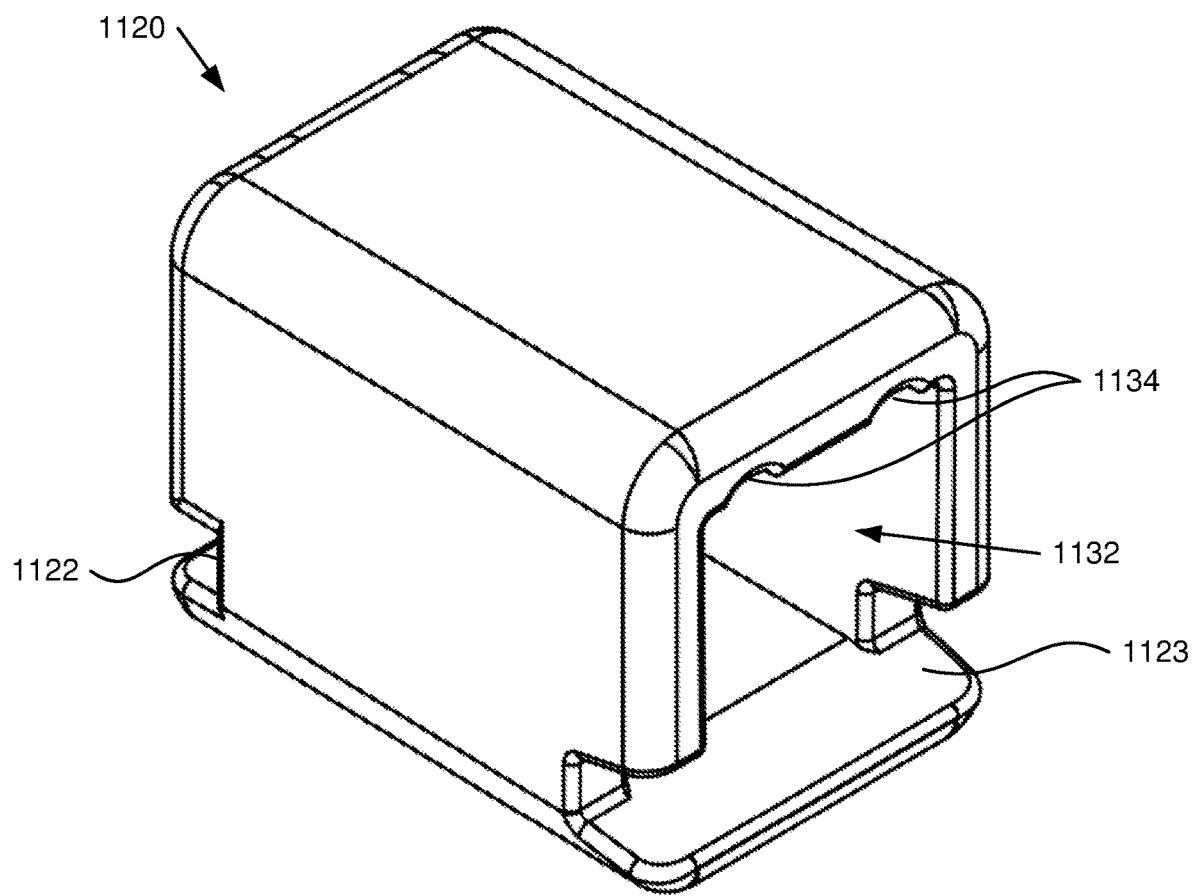
FIG. 14C is a perspective rear view of the exterior housing of the locking apparatus of FIG. 11A, according to various embodiments.

FIG. 14A is a side view of an exterior housing 1120 of the locking apparatus 1100 of FIG. 11A, according to various embodiments. FIG. 14B is a perspective front view of the exterior housing 1120 and FIG. 14C is a perspective rear view of the exterior housing 1120 of the locking apparatus 1100 of FIG. 11A, according to various embodiments. In other embodiments, the exterior housing 1120 is modified to have a single locking mechanism and may be used for the housing 1002 of FIGS. 10A-F. In some embodiments, the exterior housing 1120 is shaped for the insert 1140 of FIGS. 13A-C to be inserted into the exterior housing 1120 to form the locking apparatus 1100 of FIGS. 11A-C. In other embodiments, the exterior housing 1120 and insert 1140 are shaped to retain the fixing member 1004 in one side and to have a locking mechanism in a second side (e.g., locking apparatus 1000).

A first side of the exterior housing 1120 includes a slack management slot 1122 with two tabs 1124 to retain a slack end of the fixing member 1004. The slack management slot 1122, as depicted in FIGS. 14A-C, is fully formed without the insert 1140. In other embodiments, the slack management slot 1122 is formed partially by the insert 1140. A second side of the exterior housing 1120 opposite the first side includes a bottom portion 1123 of the slack management slot 1154 of the insert 1140 of FIGS. 13A-B. The bottom portion 1123 combines with the slack management slot 1154 of the insert 1140 to form a slack management slot similar to the slack management slot 1122 on the first side of the exterior housing 1120.

The exterior housing 1120 includes two lock path entrances 1126 with chamfered edges 1128. The lock path entrances 1126 are shaped to accommodate insertion of the fixing member 1004. The chamfered edges 1128 are shaped to more easily facilitate insertion of an end of the fixing member 1004. In some embodiments, the chamfered edges 1128 start a chamfer at a diameter that is around twice a diameter of the lock path entrances 1126 and slope inward towards the lock path entrances 1126. Other embodiments include chamfered edges that are larger or smaller than twice the diameter of the lock path entrances. While the lock path entrances 1126 are depicted as round, other shapes are used to match fixing members 1004 that have different shapes. The exterior housing 1120, in some embodiments, includes an injection molding point 1130 on the first side of the exterior housing 1120. In other embodiments, the injection molding point 1130 is located elsewhere on the exterior housing 1120.

The exterior housing 1120 includes an opening 1132 sized to accommodate the insert 1140. In some embodiments, the exterior housing 1120 and insert 1140 are shaped so that an end of the opening 1132 slopes inward to provide a friction fit of the insert 1140 and the insert 1140 is pressed into the opening 1132 of the exterior housing 1120. In other embodiments, the insert 1140 is retained in the exterior housing 1120 using a ridge on the insert 1140 and recess on the exterior housing 1120, or vice versa. In other embodiments, the exterior housing 1120 includes a clip that clips in the insert 1140. One of skill in the art will recognize other ways to retain the insert 1140 into the exterior housing 1120.

In some embodiments, the exterior housing 1120 includes an upper channel 1134 for each roller compartment 1142. The upper channel 1134 is shaped to accommodate a portion of the fixing member 1004. In the depicted embodiment, the upper channel 1134 is round to accommodate a round fixing member 1004, such as a cable. In some embodiments, the upper channel 1134 is sized to accommodate up to half of the fixing member 1004. In some embodiments, the upper channel 1134 has a depth in a range of 5 percent to 50 percent of the fixing member 1004.

The depth of the upper channel 1134 is chosen based on a tradeoff between a depth sufficient to guide the fixing member 1004, to provide resistance to movement of the fixing member 1004 when the fixing member 1004 is moved in the locking direction, and/or to allow for deformation of a shape of the fixing member 1004 when force is applied to the fixing member 1004. Where the fixing member 1004 is a cable, pressure from the roller 1104, in some embodiments, deforms the fixing member 1004. If the upper channel 1134 is too deep, the deformation of the cable causes the roller 1104 to hit the top portion of the roller compartment 1142 before securing the fixing member 1004. If the upper channel 1134 is too shallow or non-existent, pressure from the roller 1104 causes the fixing member 1004 to move to one side, which could decrease contact with the roller 1104 in a gap between the roller 1104 and a side of the roller compartment 1142.

Experimentation indicates that a depth of the upper channel 1134 of around one-third of the height of the fixing member 1004, where the fixing member 1004 is a cable, is a good choice. In some embodiments, the depth of the upper channel 1134 is in a range of about 25 percent to 35 percent of the height of the fixing member 1004. Stiffness of the fixing member 1004, resistance of the upper channel 1134, shape of the fixing member 1004, etc. influence an optimal depth of the upper channel 1134.

While the upper channel 1134 is rounded, in other embodiments, the shape of the upper channel 1134 is another shape to accommodate a fixing member 1004 that is shaped differently. In examples where the fixing member 1004 is square or rectangular, the upper channel 1134 and/or lower channel 1146, 1150 are square or rectangular. One of skill in the art will recognize other appropriate shapes and depths of the upper channel 1134 and/or lower channel 1146, 1150.

Figure 15:
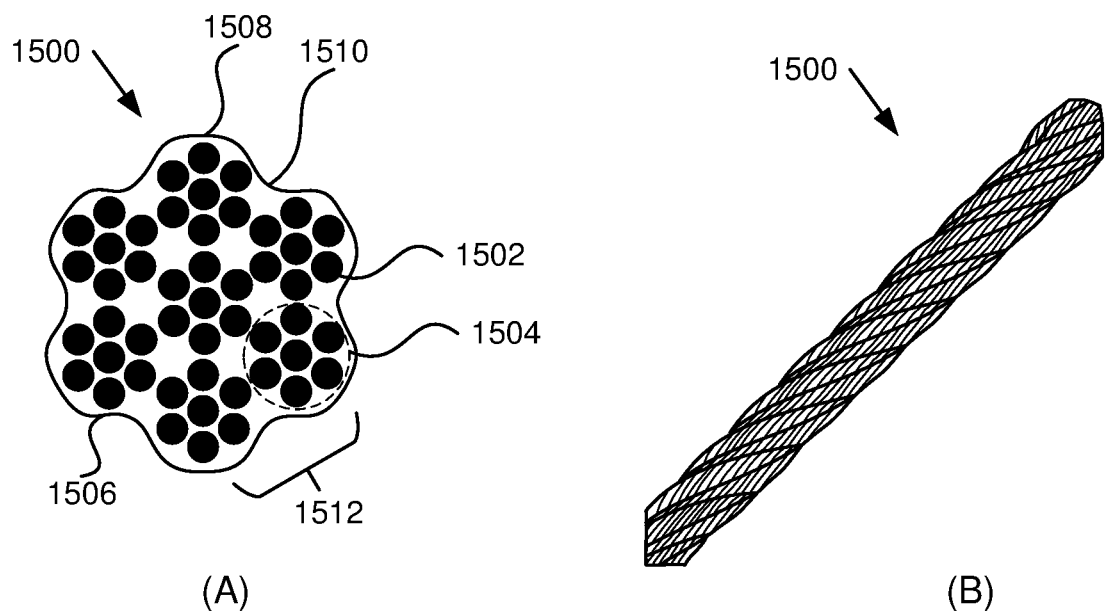
FIG. 15 is a) a cross section view and b) a side view of a fixing member as a cable of the locking apparatuses of FIGS. 10A and 11A, according to various embodiments.

FIG. 15 is a) a cross section view and b) a side view of a fixing member 1004 as a cable 1500 of the locking apparatuses of FIGS. 10A and 11A, according to various embodiments. The cable 1500, in some embodiments, is constructed by winding strands of wire 1502 into bundles 1504. The bundles 1504 are then wound together into a cable 1500. In some embodiments, the cable 1500 includes a coating 1506. A natural shape of the cable 1500 typically includes ridges 1508 and valleys 1510 with a ridge-to-ridge distance 1512 that depends on the number of strands of wire 1502 and number of bundles 1504 in the cable 1500. Note that the coating 1506 may fill in the valleys 1510 on some cables 1500.

In some embodiments, the cable 1500 is made of steel. In various embodiments, the cable 1500 is made of stainless-steel, steel, zinc-coated steel, galvanized steel, copper, aluminum, etc. In other embodiments, the coating 1506 is a plastic, a polymer, a rubber, or the like. In some embodiments, the coating 1506 is ultraviolet ("UV") light resistant, freeze resistant, heat resistant, etc. and is designed to not degrade over the expected life of the locking apparatus 1000, 1100. In some embodiments, the cable 1500 is stainless-steel with a UV and weather resistant coating 1506.

Figure 16B:
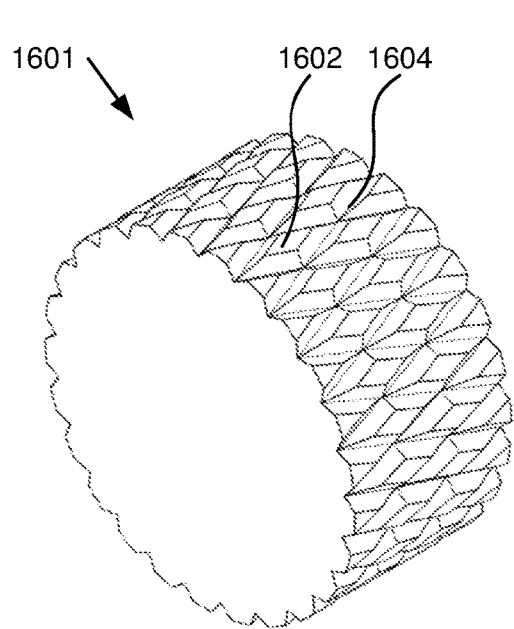
FIG. 16B is a perspective view of a roller with raised areas with a flat top, according to various embodiments.

FIG. 16A is a perspective view of a knurled roller 1600, which may be similar to the one or more rollers 1104 of the locking apparatus of FIG. 10A and/or FIG. 11A, according to various embodiments. FIG. 16B is a perspective view of a roller 1601 with raised areas 1602 with a flat top, according to various embodiments. The knurled rollers 1600, 1601 includes raised areas 1602 and valleys 1604 between the raised areas 1602. In some embodiments, the valleys 1604 are in straight lines or semi-straight lines. In other embodiments, the valleys 1604 are perpendicular and the raised areas 1602 have a base that is square. In other embodiments, the valleys 1604 are angled so that the raised areas 1602 have a diamond shape. In some embodiments, the valleys 1604 are positioned at about 45 degrees with respect to a circumference of the knurled rollers 1600, 1601. In other embodiments, the valleys 1604 are aligned with and perpendicular to the circumference of the knurled rollers 1600, 1601.

In some embodiments, the raised areas 1602 are arranged in a direction perpendicular to the circumference of the knurled rollers 1600, 1601. In other embodiments, the raised areas 1602 are arranged in a direction parallel to the valleys 1604. In FIG. 16A, the raised areas 1602 and valleys 1604 are approximately 45 degrees with respect to the circumference of the knurled rollers 1600, 1601, but are not exactly 45 degrees.

A knurl-to-knurl distance 1606 between raised areas 1602 in the direction substantially perpendicular to the circumference of the knurled roller 1104 is depicted. In some embodiments, the knurl-to-knurl distance 1606 is selected to match or substantially match the ridge-to-ridge distance 1512 of the cable 1500 to allow ridges 1508 of the cable 1500 to fit between the raised areas 1602 of the knurled roller 1600, as depicted in FIG. 17.

Figure 16C:
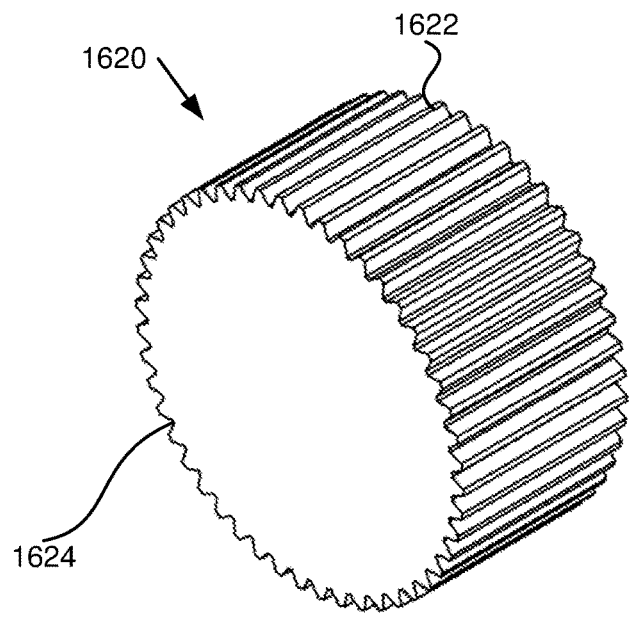
FIG. 16C is a perspective view of a roller with parallel ridges, and according to various embodiments.

FIG. 16C includes a roller 1620 with ridges 1622 that are parallel to each other and perpendicular to a circumference of the roller 1620. The roller 1620 has valleys 1624 between the ridges 1622. The roller 1620 of FIG. 16C, in some embodiments, is effective at reducing lash and maintaining a tight grip on the fixing member 1004. In various embodiments, spacing of the ridges 1622, height of the ridges 1622, etc. is chosen to optimize a holding strength of a fixing member 1004 without damaging the fixing member 1004.

Figure 17:
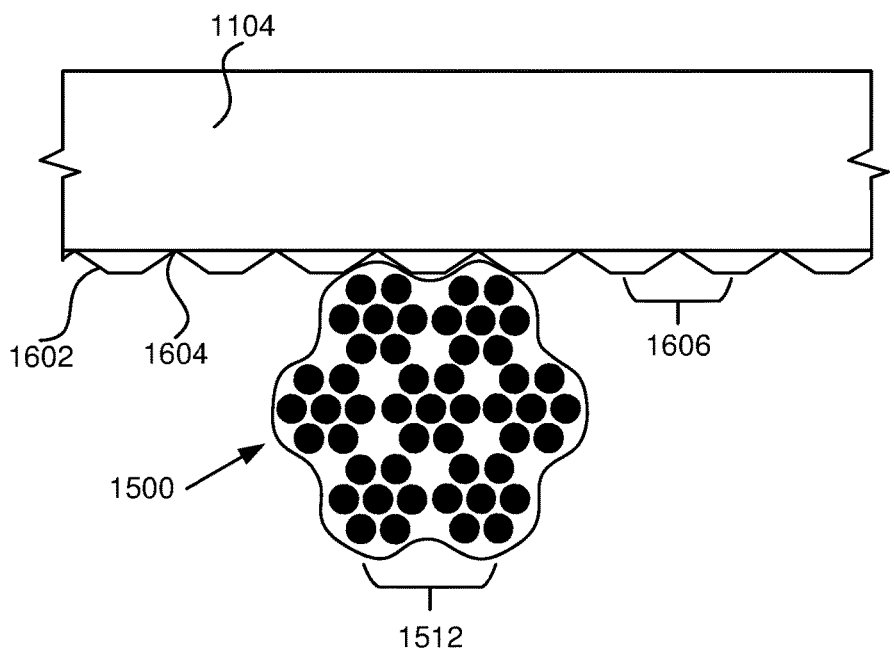
FIG. 17 is a cross section view of raised portions of a knurled roller in relation to ridges of a cable, according to various embodiments.

FIG. 17 is a cross section view of raised areas 1602 of a knurled roller 1600 in relation to ridges 1508 of a cable, according to various embodiments. Experimentation has found that having a knurled roller pattern with raised areas 1602 spaced so ridges 1508 of the cable 1500 fits in between functions better than knurled roller patterns with raised areas 1602 that are closer together or wider apart. In some embodiments, the width of the raised areas 1602 matches spacing between ridges 1508 of the cable 1500. In other embodiments, the width of the raised areas 1602 is within about 20 percent of spacing between ridges 1508 of the cable 1500. In other embodiments, the width of the raised areas 1602 is sized with respect to spacing between ridges 1508 of the cable 1500 to allow a majority of a ridge 1508 of the cable 1500 to fit between raised areas 1602 of the knurled roller 1600.

In certain designs, placing pressure on a cable 1500 that is secured between the knurled roller 1600 and the upper channel 1134 tears the coating 1506 and allows the cable 1500 to slip causing failure of the locking apparatus 1000, 1100. While spacing between the raised areas 1602 is a factor in success or failure of the locking apparatus 1000, 1100, the shape of the raised areas 1602 also affects success or failure of the locking apparatus 1000, 1100. Experimentation has shown that pointed tips on the raised areas 1602 contributes to stripping the coating 1506 and/or slippage of some types of cable 1500. In some embodiments, the raised areas 1602 include a top with a divot, as depicted in FIG. 16A. In other embodiments, the raised areas 1602 include a flat top or a rounded top.

Figure 18A:
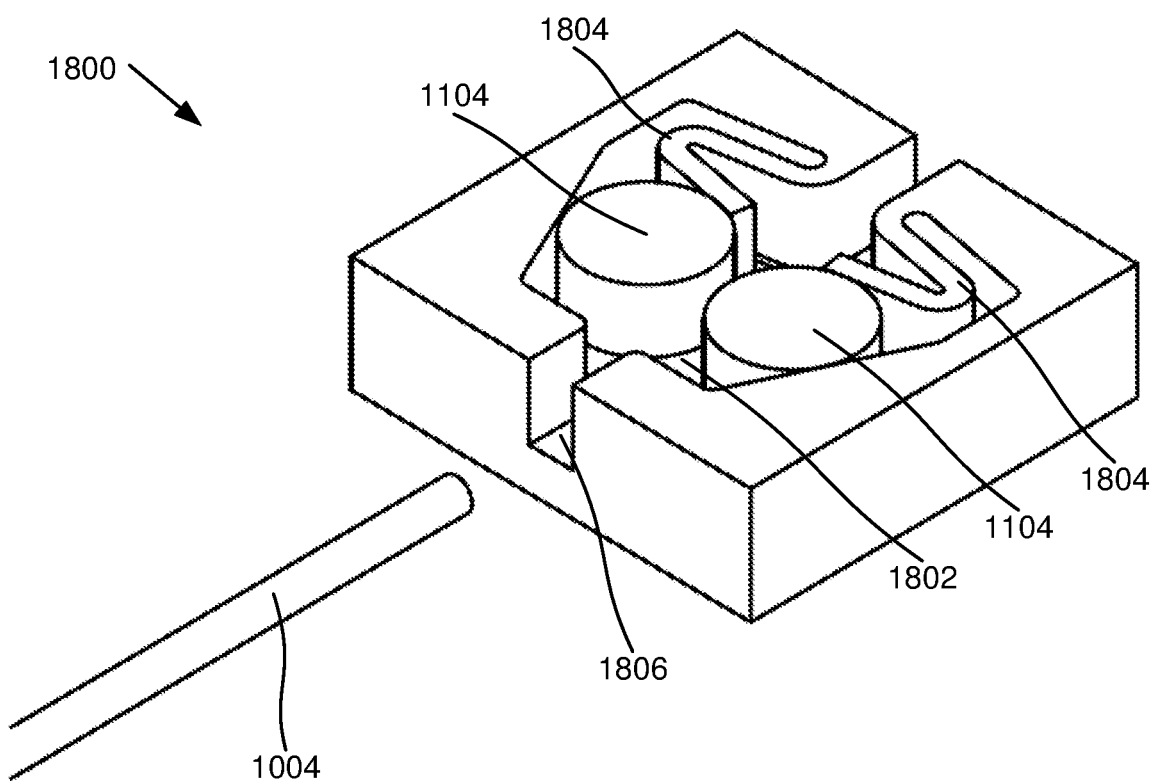
FIG. 18A is a partial perspective view of a portion of a locking apparatus with a roller compartment with a first type of spring prior to insertion of a fixing member, according to various embodiments.
Figure 18B:
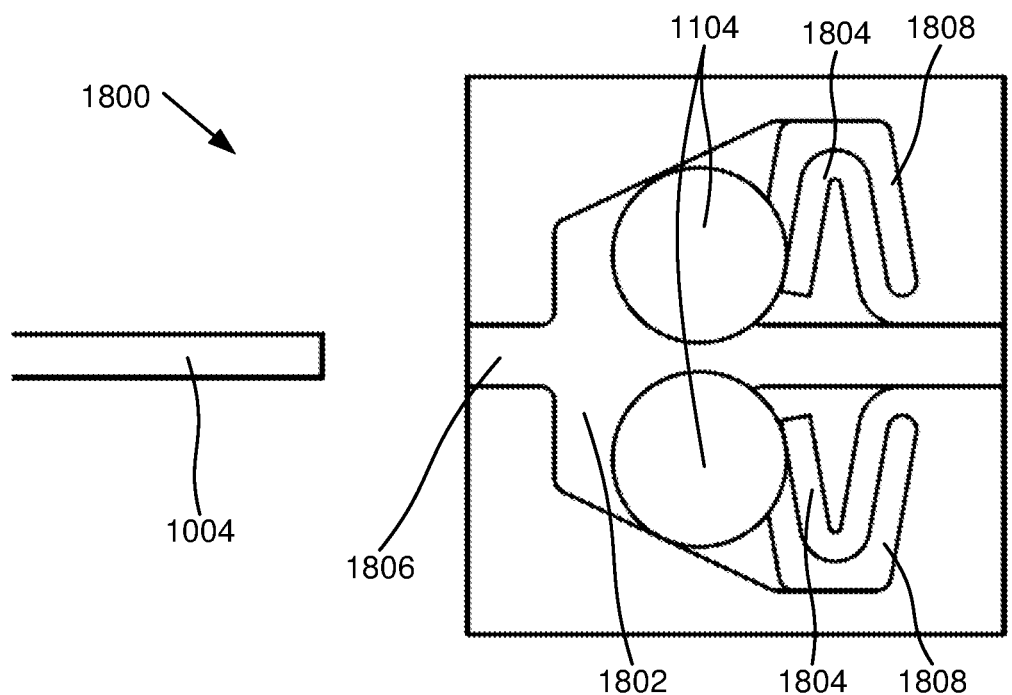
FIG. 18B is a partial top view of the portion of a locking apparatus of FIG. 18A, according to various embodiments.

FIG. 18A is a partial perspective view and FIG. 18B is a partial top view of a portion of a locking apparatus 1800 with a roller compartment 1802 with a first type of spring prior to insertion of a fixing member 1004, according to various embodiments. The partial views are of a portion of a roller compartment 1802 of a locking apparatus, such as the roller compartment 1142 of the locking apparatus 1000, 1100 described above in relation to FIGS. 10A-F, 11A-C, 12, 13A-B, 14A-C. The rollers 1104 are substantially similar to those described in relation to the locking apparatus 1000, 1100 described above. The fixing member 1004 is also substantially similar to those described above. The portion of the locking apparatus 1800 also includes an upper channel 1806, which is similar to the upper channel 1134 described above.

In the embodiments of FIGS. 18A and 18B, the roller compartment 1802 includes two rollers 1104 and also includes two first springs 1804 that are a first type of spring. (Other spring types are described below with regards to FIGS. 18E-H.) In some embodiments, the first springs 1804 are formed during manufacturing of the locking apparatus and roller compartment 1802. In the embodiments, the first springs 1804 are made of a same material as the locking apparatus 1000, 1100 described above. In some embodiments, the first springs 1804 are made of a molded plastic, polymer, or the like. In other embodiments, the first springs 1804 are formed separately and are then inserted into the roller compartment 1802. In the embodiments, the first springs 1804 are made from a stamped metal, wire form, etc. and are then inserted into the roller compartment 1802, for example in a slot, groove, etc. in the roller compartment 1802. One of skill in the art will recognize other ways to create and/or install the first springs 1804.

Figure 18C:
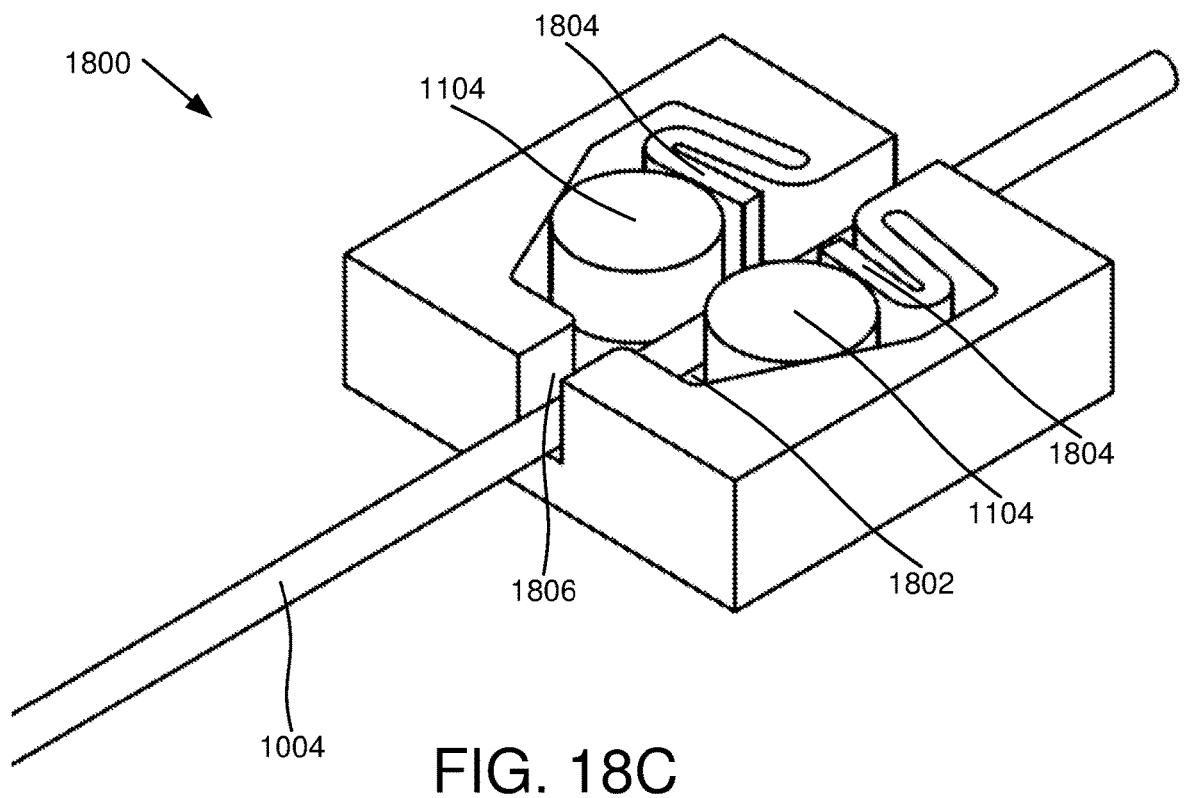
FIG. 18C is a partial perspective view of the portion of a locking apparatus of FIG. 18A with the springs compressed after insertion of a fixing member, according to various embodiments.
Figure 18D:
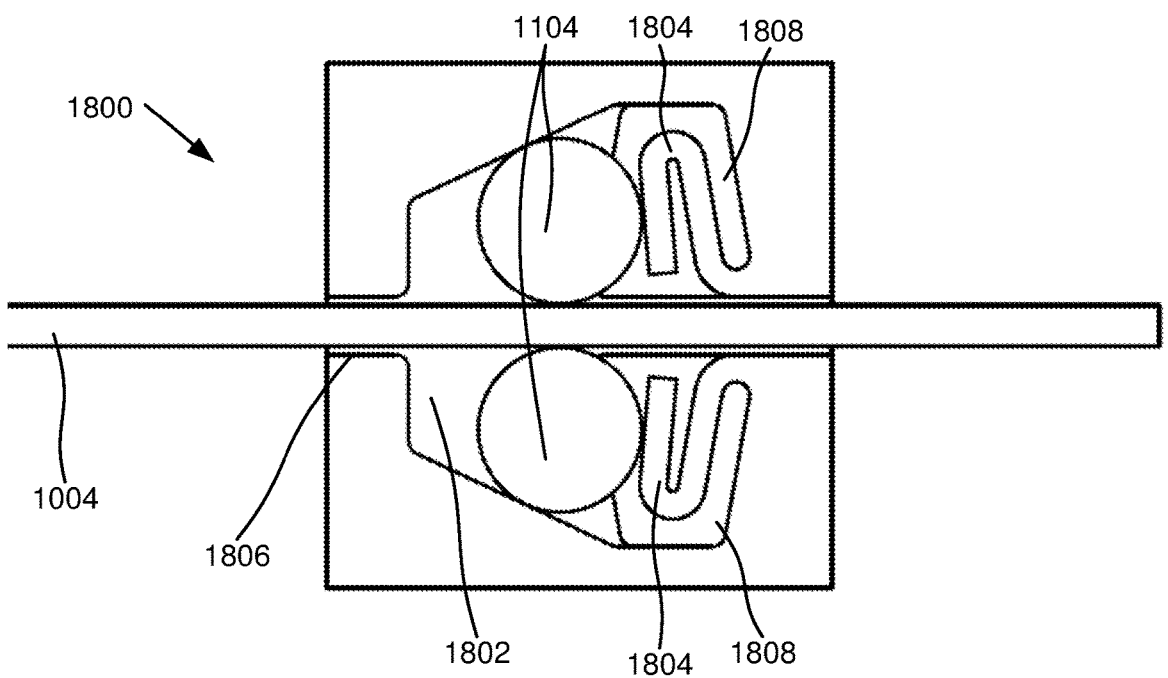
FIG. 18D is a partial top view of the portion of a locking apparatus of FIG. 18C with the springs compressed after insertion of a fixing member, according to various embodiments.

FIG. 18C is a partial perspective view and FIG. 18D is a partial top view of the portion of a locking apparatus 1800 with the roller compartment 1802 of FIG. 18A with the first springs 1804 compressed after insertion of a fixing member 1004, according to various embodiments. As the fixing member 1004 is inserted, the fixing member 1004 contacts the rollers 1104, which are moved towards the first springs 1804 and compress the first springs 1804. Beneficially, the first springs 1804 hold the rollers 1104 in a position so that the rollers 1104 are not relying on gravity or by being moved by the fixing member 1004 to be moved into position. Having the rollers 1104 held in position, in some embodiments, decreases lash and allows for one locking mechanism to accept different diameters of the fixing member 1004. In some examples, the fixing member 1004 may be a cable and may have a diameter of 1.5 millimeters or a diameter of 2.0 millimeters. In the embodiments, the upper channel 1806 may be larger than some fixing members 1004 that may be used.

The roller compartment 1802, in some embodiments, includes an open section 1808 below the first springs 1804, which may be used to access the first springs 1804 with a release tool (not shown) or other tools, such as screw drivers, needle nose pliers, etc. In various embodiments, all or a portion of the first springs 1804 are accessible through the open section 1808.

Figure 18E:
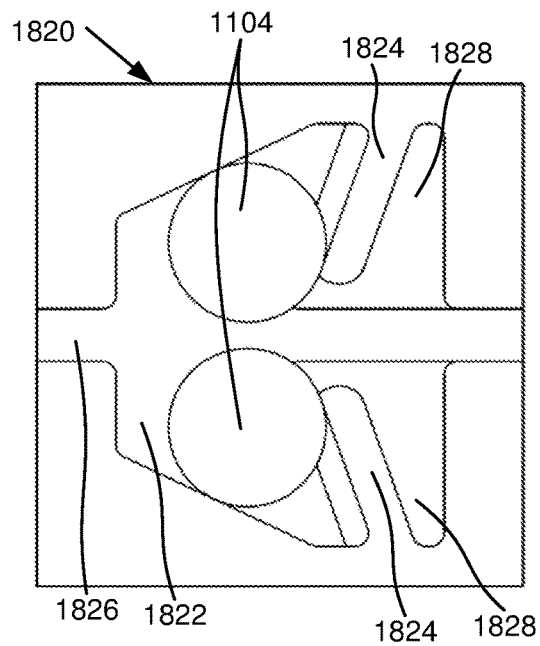
FIG. 18E is a partial top view of a portion of a locking apparatus with a roller compartment with a second type of spring, according to various embodiments.

FIG. 18E is a partial top view of a portion of a locking apparatus 1820 with a roller compartment 1822 with a second type of spring (second springs 1824), according to various embodiments. In the embodiments, the portion of the locking apparatus 1820 includes a roller compartment 1822, an upper channel 1826, and rollers 1104 similar to those described above. The second springs 1824 are straight and, in some embodiments, are simpler to make than the first springs 1804 described above. The second springs 1824, in some embodiments, have less design freedom than the first springs 1804 and may be thinner or stiffer than the first springs 1804. In some embodiment, the second springs 1824 are exposed with an open section 1828 under all or a portion of the second springs 1824.

Figure 18F:
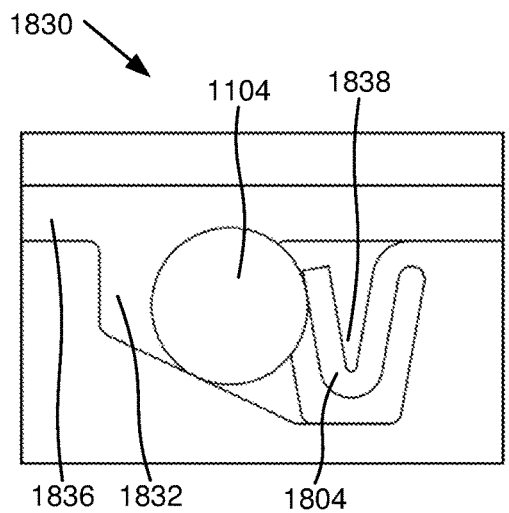
FIG. 18F is a partial top view of a portion of a locking apparatus with roller compartment with a single roller with the first type of spring, according to various embodiments.

FIG. 18F is a partial top view of a portion of a locking apparatus 1830 with roller compartment 1832 with a single roller 1104 with the first type of spring (first spring 1804), according to various embodiments. In the embodiments, the portion of the locking apparatus 1830 includes a roller compartment 1832, an upper channel 1836, and roller 1104 similar to those described above, but there is only a single roller 1104 and a single first spring 1804. Where only a single roller 1104 and single first spring 1804 is used, in some embodiments, the first spring 1804 has a different spring force than the two first springs 1804 described in relation to the portion of the locking apparatus 1800 of FIGS. 18A-D. As with the portion of the locking apparatus 1800 of FIGS. 18A-D, an open section 1838 is below all or a portion of the first spring 1804.

Figure 18G:
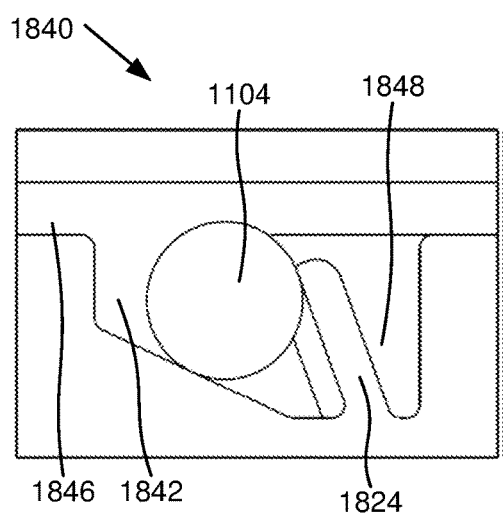
FIG. 18G is a partial top view of a portion of a locking apparatus with roller compartment with a single roller with the second type of spring, according to various embodiments.

FIG. 18G is a partial top view of a portion of a locking apparatus 1840 with roller compartment 1842 with a single roller 1104 with the second type of spring 1824, according to various embodiments. In the embodiments, the portion of the locking apparatus 1840 includes a roller compartment 1842, an upper channel 1846, and roller 1104 similar to those described above in relation to FIG. 18E, but there is only a single roller 1104 and a single second spring 1824. Where only a single roller 1104 and single second spring 1824 is used, in some embodiments, the second spring 1824 has a different spring force than the two second springs 1824 described in relation to the portion of the locking apparatus 1820 of FIG. 18E. As with the portion of the locking apparatus 1840 of FIG. 18G, an open section 1848 is below all or a portion of the second spring 1824.

Figure 18H:
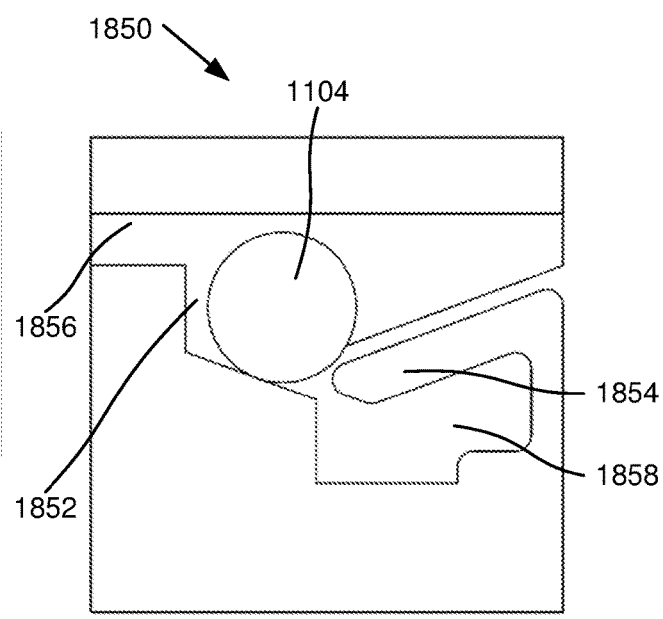
FIG. 18H is a partial top view of a portion of a locking apparatus with roller compartment with a single roller with a fourth type of spring, according to various embodiments.

FIG. 18H is a partial top view of a portion of a locking apparatus 1850 with roller compartment 1852 with a single roller 1104 with a third type of spring (third spring 1854), according to various embodiments. In the embodiments, the portion of the locking apparatus 1850 includes a roller compartment 1852, an upper channel 1856, and roller 1104 similar to those described above in relation to FIGS. 18A-G and includes only a single roller 1104 and a single third spring 1854. The portion of the locking apparatus 1850 of FIG. 18H includes an open section 1858 is below all or a portion of the third spring 1854. In the embodiments of FIGS. 18H, the first direction 108 and the second direction 110 are reversed and a fixing member 1004 moving left-to-right will jamb the roller 1104 against the third spring 1854 while the fixing member 1004 moving right-to-left will move freely.

Figure 19:
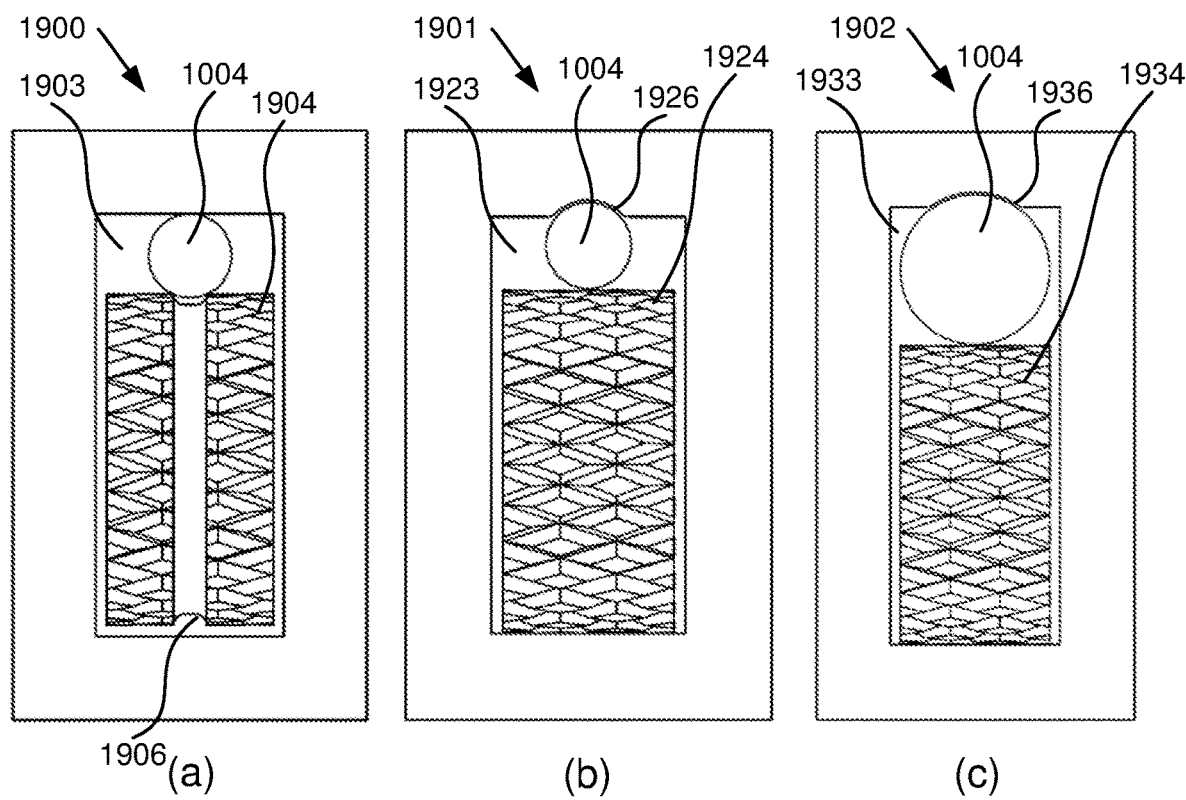
FIG. 19 is a side section view of (a) a portion of a locking apparatus with a roller compartment with a roller with a center channel, (b) a portion of a locking apparatus with a roller compartment with a roller with a smaller fixing member, and (c) a portion of a locking apparatus with a roller compartment with a roller with a larger fixing member.

FIG. 19 is a side section view of (a) a portion of a locking apparatus 1900 with a roller compartment 1903 with a roller 1904 with a center channel 1906, (b) a portion of a locking apparatus 1901 with a roller compartment 1923 with a roller 1904 with a smaller fixing member 1004, and (c) a portion of a locking apparatus 1902 with a roller compartment 1933 with a roller 1934 with a larger fixing member 1004. The portions of locking apparatus 1900, 1901, 1902 of FIGS. 19(*a*)-(*c*), in some embodiments, are useful for the single roller embodiments of FIGS. 18F, 18G, and 18H.

The portion of the locking apparatus 1900 of FIG. 19(*a*) includes a roller compartment 1903 without a channel, groove, etc. on a side where the fixing member 1004 contacts the roller compartment 1903. To maintain the fixing member 1004 in the middle of the roller 1904, the roller 1904 includes a center channel 1906 that allows an appropriately sized roller 1904 to rest in the center channel 1906. With a spring, such as the springs 1804, 1824, 1854 of FIGS. 18F-H, in some embodiments, the fixing member 1004 remains in the center channel 1906, which is centered on the roller 1904. In other embodiments, the roller 1904 with a center channel 1906 is used in applications with two rollers, such as the locking apparatus 1000, 1100 described above.

FIG. 19(*b*) includes a portion of a locking apparatus 1901 with a roller compartment 1923 with a roller 1924 similar to the rollers 1104 described above and with an upper channel 1926 shaped to retain the fixing member 1004 in a center of the roller 1924. Likewise, FIG. 19(*c*) includes a portion of a locking apparatus 1902 with a roller compartment 1933 with a roller 1934 similar to the rollers 1104 described above and with a larger upper channel 1936 shaped to retain a larger fixing member 1004 in a center of the roller 1934.

Where a spring are used in a locking apparatus (e.g., 1000, 1100), such as the springs 1804, 1824, 1854 of FIGS. 18F-H, fixing members 1004 of different sizes may be used. The larger upper channel 1936 of FIG. 19(c), in some embodiments, maintains the fixing member 1004 in the center of the roller 1934 for fixing members 1004 of different sizes.

Beneficially, the locking apparatuses 1000, 1100 of FIGS. 10A-F, 11A-C, 12, 13A-B, 14A-C, 15, 16A-C, and 17 provide a convenient way to secure a fixing member 1004 and/or cable 1500 around an object with minimal lash and a strength sufficient, in some embodiments, for the fixing member 1004/cable 1500 to break before the locking mechanism of the locking apparatuses 1000, 1100 break. The locking apparatuses 1000, 1100 provide an excellent way to secure cables, wiring, wireways, solar panels, or the like indoors and outdoors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A locking apparatus comprising:
   a housing defining a sloped ramp, a first channel having a first chamfered edge disposed about a first lock path entrance, and a second channel having a second chamfered edge disposed about a second lock path entrance, wherein the first channel and the second channel define a lock path;
   a fixing member installed in the first channel and the second channel to define a loop;
   a locking mechanism within the housing configured to resist movement of the fixing member in a first direction and to allow movement of the fixing member in a second direction opposite the first direction, the locking mechanism comprising one or more rollers that are installed on the sloped ramp; and
   a slack management slot defining an open channel in the housing, the slot defining a tab that protrudes into the open channel, the slack management slot and tab configured to hold a portion of the fixing member.

2. The locking apparatus of claim 1, wherein the locking mechanism comprises a roller compartment comprising the one or more rollers, the roller compartment comprising a bottom, the bottom opposite a top portion, wherein the fixing member extends through the roller compartment in the top portion.

3. The locking apparatus of claim 1, wherein a slope of the sloped ramp is in a range of 10 degrees to 35 degrees.

4. The locking apparatus of claim 3, wherein the slope of the sloped ramp is in a range of 17 degrees to 23 degrees.

5. The locking apparatus of claim 2, wherein the roller compartment further comprises a spring for each of the one or more rollers, each spring positioned to apply a spring force on a roller of the one or more rollers in first direction.

6. The locking apparatus of claim 5, wherein each spring of the one or more rollers is formed along with the housing of a material used to form the housing.

7. The locking apparatus of claim 1, wherein the one or more rollers comprise one or more textured rollers comprising a textured outer surface in contact with the fixing member.

8. The locking apparatus of claim 7, wherein a texture pattern of the one or more textured rollers comprises a rough surface, an irregular surface, and/or a knurled pattern, the knurled pattern comprising raised areas with one of a rounded top, a flat top, and a top with a divot.

9. The locking apparatus of claim 8, wherein the fixing member is a cable comprising an exterior surface with ridges and valleys and wherein the one or more rollers comprise a knurled pattern with raised areas and wherein a distance between two adjacent raised areas of a roller of the one or more rollers measured in a direction perpendicular to a circumference of the roller is selected to allow a ridge of the cable to fit between the two adjacent raised areas.

10. The locking apparatus of claim 1, wherein the fixing member comprises a cable, the cable comprises one of a stainless-steel cable and a galvanized steel cable.

11. The locking apparatus of claim 10, wherein the cable comprises a coating and the coating comprises a plastic, a polymer, and/or a rubber.

12. The locking apparatus of claim 1, wherein a first end of the fixing member is attached to the housing and wherein a portion of the fixing member opposite the first end comprises a second end, wherein the second end is configured to fit in the lock path entrance, to extend through the locking mechanism and out the lock path exit.

13. The locking apparatus of claim 1, wherein the housing comprises one of a metallic body and an injection molded body.

14. The locking apparatus of claim 13, wherein the metallic body comprises a covering.

15. The locking apparatus of claim 1, wherein the slack management opening comprises an opening through the housing, the opening different from the lock path.

16. The locking apparatus of claim 1, wherein the slack management opening comprises a slot on the housing, the slot is shaped to accommodate and retain a slack portion of the fixing member, the slack portion of the fixing member on the portion of the fixing member.

17. A locking apparatus comprising:
    a housing defining a sloped ramp, a first channel having a first chamfered edge disposed about a first lock path entrance, and a second channel having a second chamfered edge disposed about a second lock path entrance wherein the first channel and the second channel define a lock path;
    a fixing member comprising a first end and a second end opposite the first end, wherein the fixing member comprises a cable and wherein the first end of the fixing member is installed in the first channel of the housing;
    a locking mechanism within the housing configured to resist movement of the fixing member in a first direction and to allow movement of the fixing member in a second direction opposite the first direction, the locking mechanism comprising a textured roller;
    a lock path extending from a lock path entrance, through the locking mechanism, to a lock path exit; and
    a slack management slot defining an open channel in the housing, the slot defining a tab that protrudes into the open channel, the slack management slot and tab configured to hold a portion of the fixing member.

18. The locking apparatus of claim 17, wherein the locking mechanism comprises a roller compartment comprising the textured roller, the roller compartment comprising a bottom, the bottom opposite a top portion, wherein the fixing member extends through the roller compartment in the top portion and wherein the bottom comprises a sloped ramp angled upward towards the lock path entrance, and wherein the top portion comprises an upper channel sized to conform to a portion of the cable, wherein a depth of the upper channel is in a range of 25 percent to 35 percent of a diameter of the cable.

19. The locking apparatus of claim 18, wherein a slope of the sloped ramp is in a range of 17 degrees to 23 degrees.

20. A locking apparatus comprising:
   a housing;
   a fixing member comprising a first end and a second end opposite the first end, wherein the fixing member comprises a cable and wherein the first end of the fixing member is attached to the housing;
   a locking mechanism within the housing configured to resist movement of the fixing member in a first direction and to allow movement of the fixing member in a second direction opposite the first direction, the locking mechanism comprising a roller compartment comprising a textured roller, the roller compartment comprising a bottom, the bottom opposite a top portion, wherein the fixing member extends through the roller compartment in the top portion and wherein the bottom comprises a sloped ramp angled upward towards a lock path entrance, a slope of the sloped ramp in a range of 10 degrees to 35 degrees, and wherein the top portion comprises an upper channel sized to conform to a portion of the cable, wherein a depth of the upper channel is in a range of 25 percent to 35 percent of a diameter of the cable;
   a lock path extending from the lock path entrance, through the locking mechanism, to a lock path exit; and
   a slack management slot defining an open channel in the housing, the slot defining a tab that protrudes into the open channel, the slack management slot and tab configured to hold a portion of the fixing member.

* * * * *